United States Patent
Menashe et al.

(10) Patent No.: US 10,145,942 B2
(45) Date of Patent: Dec. 4, 2018

(54) TECHNIQUES FOR SPATIO-TEMPORAL COMPRESSED TIME OF FLIGHT IMAGING

(71) Applicant: INTEL CORPORATION, Santa Clara, CA (US)

(72) Inventors: Ohad Menashe, Haifa (IL); Alexander Bronstein, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 616 days.

(21) Appl. No.: 14/671,238

(22) Filed: Mar. 27, 2015

(65) Prior Publication Data

US 2016/0282452 A1  Sep. 29, 2016

(51) Int. Cl.
   *G01S 7/491*   (2006.01)
   *G01S 17/89*   (2006.01)
   *G01S 17/93*   (2006.01)
   *G01S 17/46*   (2006.01)

(52) U.S. Cl.
   CPC .......... *G01S 7/4913* (2013.01); *G01S 7/4911* (2013.01); *G01S 17/46* (2013.01); *G01S 17/89* (2013.01); *G01S 17/93* (2013.01)

(58) Field of Classification Search
   CPC ................ G01S 7/4913; G01S 17/89
   See application file for complete search history.

(56) References Cited

U.S. PATENT DOCUMENTS

| | | | |
|---|---|---|---|
| 9,638,801 B2 * | 5/2017 | Boufounos | ............. G01S 17/89 |
| 2010/0026850 A1 | 2/2010 | Katz | |
| 2011/0037849 A1 | 2/2011 | Niclass et al. | |
| 2013/0301497 A1 | 11/2013 | Gonikberg et al. | |
| 2013/0320197 A1 | 12/2013 | Asayama et al. | |
| 2016/0005179 A1 | 1/2016 | Petyushko et al. | |

OTHER PUBLICATIONS

Donoho, David L. "Compressed Sensing", Department of Statistics, Stanford University, Sep. 14, 2004, 34 pages.
Baraniuk et al., "A Simple Proof of the Restricted Isometry Property for Random Matrices", copyright Springer Science+Business Media, LLC 2008, Feb. 5, 2007, 11 pages.
Office Action and Search Report received for Taiwanese Patent Application No. 105105520, dated Feb. 22, 2017, 22 pages including 10 pages English translation.

* cited by examiner

*Primary Examiner* — Yu-Hsi D Sun

(57) ABSTRACT

Various embodiments are generally directed to an apparatus, method, system, and/or other techniques to determine estimated ambient electromagnetic (EM) radiation information based at least partially on ambient recovery sensor measurement information, determine estimated albedo information based at least partially on albedo recovery sensor measurement information, albedo recovery emitter modulation information, sensing matrix information, and the estimated ambient EM radiation information, and determine estimated range information based at least partially on range recovery sensor measurement information, the estimated albedo information, range recovery emitter modulation information, and sensing matrix information.

19 Claims, 8 Drawing Sheets

TECHNIQUES FOR SPATIO-TEMPORAL COMPRESSED TIME OF FLIGHT IMAGING

TECHNICAL FIELD

Embodiments described herein generally relate to techniques for compressed sensing of albedo and/or range images.

BACKGROUND

Various navigation systems may employ remote sensing systems to measure distances to one or more objects in order to ensure proper navigation (i.e., collision avoidance and/or detection). For example, various vehicles (e.g., ground vehicles, aerial vehicles, railed vehicles, watercrafts, etc.) may utilize such navigation systems for automated navigation, collision, and/or avoidance. However, traditional remote sensing systems may require substantial amount of information to be detected, captured, and/or processed. Accordingly, an improved system, method, and/or apparatus is needed.

DETAILED DESCRIPTION

Figure 1:
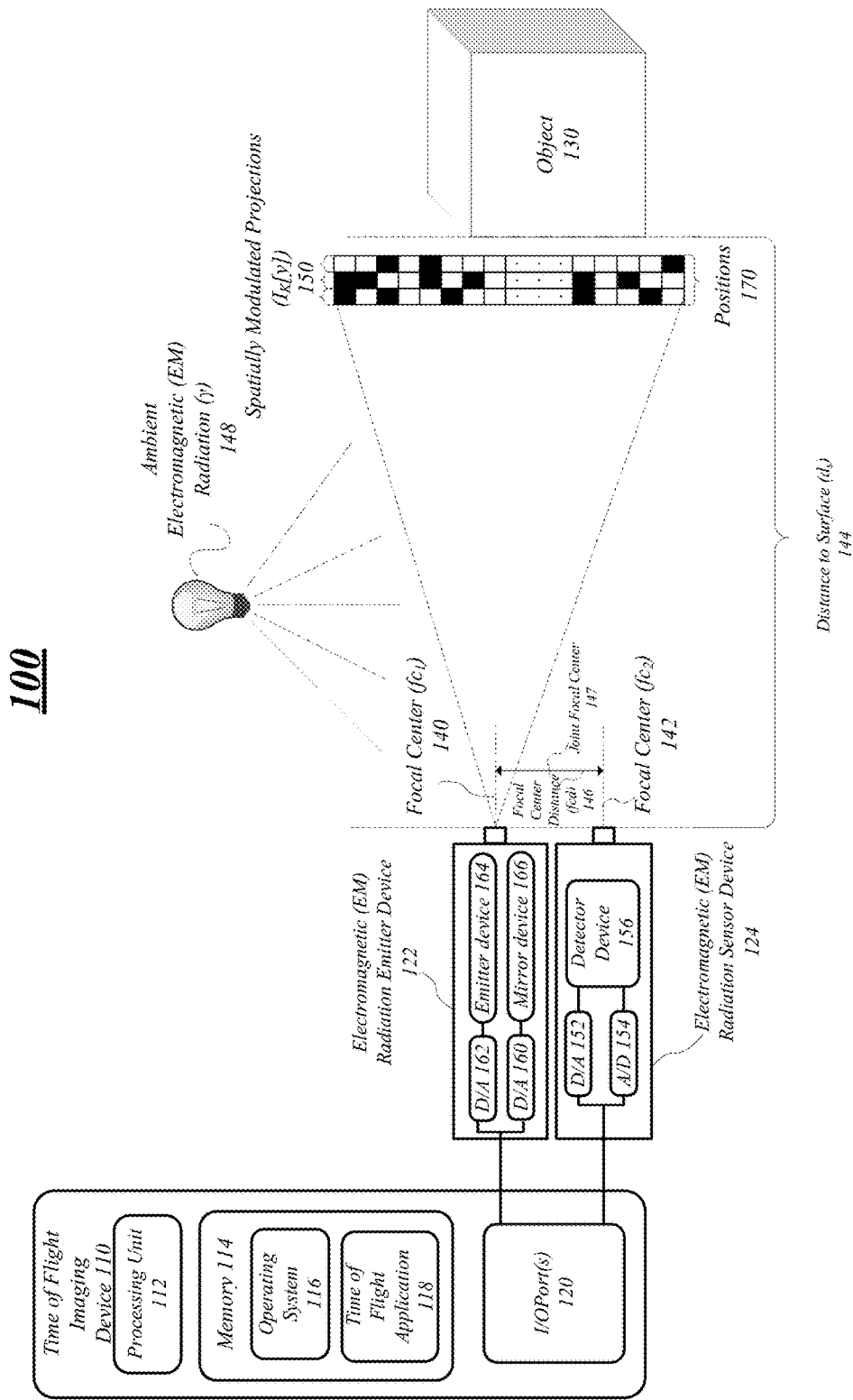
FIG. 1 illustrates an embodiment of an imaging system for determining estimated ambient EM radiation information, estimated albedo information, and/or estimated range information.

Various embodiments are generally directed to an apparatus, system, and/or method to determine estimated ambient EM radiation information, estimated albedo information, and/or estimated range information. More specifically, embodiments may be directed to an imaging apparatus, system, and/or method for a soft or hard real-time range map estimation using compressed time of flight. The medium, which may include, without limitation, any unknown objects and/or surfaces, may be illuminated by one or more sequences of structured binary patterns emitted from an electromagnetic (EM) radiation emitter device. The ambient EM radiation and/or reflected EM radiation may be collected by an EM radiation sensor device, thus creating an undercomplete set of compressed measurements, which may be reconstructed utilizing compressed or compressive sensing techniques to determine albedo map estimation (e.g., aggregate of the estimated albedo information, etc.) and/or range map estimation (e.g., aggregate of the estimated range information, etc.).

In some embodiments, the albedo map estimation may include, without limitation, a two dimensional (2D) albedo image represented by a two dimensional matrix having a specific resolution, where each element in the two dimensional matrix, which may correspond to a pixel in the albedo image, may be representative of an estimated albedo. Similarly, the range map estimation may include, without limitation, a 2D range image represented by a two dimensional matrix having a specific resolution, where each element in the two dimensional matrix, which may correspond to a pixel in the range image, may be representative of an estimated range or depth. In some embodiments, the 2D range image and/or 2D albedo image may be continuously updated or refreshed at a specific frequency.

In some embodiments, albedo image may be representative of an actual brightness of an object regardless of distance to an EM radiation sensor device. Stated differently, albedo image may be representative of the amount of EM radiation or a fraction of the total EM radiation an object reflects. For example, in some embodiments, an object that has a high albedo (near one (1)) may be very bright and an object that has a low albedo (near zero (0)) may be dark.

To facilitate determination of the albedo map estimation and/or range map estimation in soft or hard real-time, in some embodiments, the imaging apparatus, system, and/or method may include, but is not limited to, a time of flight imaging device, an EM radiation emitter device operatively coupled to the time of flight imaging device, and/or an EM radiation sensor device operatively coupled to the time of flight imaging device.

In some embodiments, the time of flight imaging device may be configured to provide albedo recovery emitter modulation information and/or range recovery emitter modulation information to the EM radiation emitter device to emit a spatially and temporally modulated EM radiation (e.g., photons from a scanning Light Amplification by Stimulated Emission of Radiation (LASER) source, etc.). In particular and in some embodiments, the EM radiation may be spatially modulated along a vertical axis (e.g., y-axis, etc.) with a spatial modulation function $I(y)$ and temporally modulated with a time emitter modulation function $m(t)$ during one or more emission periods as identified in the albedo emitter recovery modulation information and/or range emitter recovery modulation information, where the optical axis may be aligned (e.g., optical axis is perpendicular to the EM radiation emitter device, etc.) with the horizontal axis (e.g., x-axis, etc.), so that the EM radiation sensor device may detect or capture a symmetric image. Additionally or alternatively, in some embodiments, the EM radiation may also be spatially modulated along a horizontal axis (e.g., x-axis, etc.) with a spatial modulation function $I(x)$ and temporally modulated with a time emitter modulation function $m(t)$. Additionally or alternatively, in some embodiments, the EM radiation may be further spatially modulated along both vertical and horizontal axis (e.g., x-axis and y-axis, etc.) with a spatial modulation function $I(x, y)$ and temporally modulated with a time emitter modulation function $m(t)$.

In some embodiments, the time of flight imaging device may be further configured to provide sensor modulation information to the EM radiation sensor device (e.g., a single photon detector device, a single photon counting sensing device, etc.). In particular and in some embodiments, the EM radiation sensor device may be temporally modulated by one or more time sensor modulation functions $n(t)$ to capture ambient EM radiation represented by ambient EM radiation sensor measurement information and at least a portion of the reflected EM radiation during one or more time periods represented by albedo recovery sensor measurement information and/or range recovery sensor measurement information.

In some embodiments, the time of flight imaging device may be configured to determine the estimated ambient EM radiation information based at least partially on the ambient EM radiation sensor measurement information. In some embodiments the time of flight imaging device may be further configured to determine the estimated albedo information based at least partially on albedo recovery sensor measurement information, albedo recovery emitter modulation information, and the estimated ambient EM radiation information, where the aggregate estimated range information may be representative of the albedo map estimation represented by one or more 2D albedo images.

In some embodiments, the time of flight imaging device may be further configured to determine estimated range information based at least partially on the range recovery sensor measurement information, the estimated albedo information, and the range recovery emitter modulation information, where the aggregate estimated range information may be representative of the range map estimation which may be represented by one or more 2D range images.

It may be appreciated that by employing a-priori knowledge that albedo information and range information are compressible, compressive sensing techniques may be utilized to determine one or more 2D albedo images and/or 2D range images using far fewer projections of EM radiation per pixel (e.g., an order of magnitude less projections per pixel, etc.) when compared to traditional albedo and/or range sensing techniques. This technical advantage may further enable longer exposure times to capture sensor measurement information and lead to higher Signal to Noise Ratio (SNR) or higher frequency of updates/higher frame rates.

Additionally, in some embodiments where the EM radiation sensor device comprises a single photon detector device, substantial power, space, and/or cost savings may be achieved when compared to traditional devices configured for acquiring albedo information and/or range information using omni-directional EM radiation source and an avalanche photodiode or a PIN photodiode array, which may be bulky, power consuming, expensive, and resolution limited. Furthermore, by eliminating the spatial demand of a Digital Micro-mirror Device (DMD) typically embedded within a EM radiation sensor device and incorporating a one dimensional microelectromechanical systems (MEMS) mirror in the EM radiation emitter device, the resolution of the EM radiation sensor device may no longer be limited and as a result, higher spatial resolution may be achieved while maintaining lower power consumption. These are merely a few technical advantages that may be realized by the apparatus, system, and/or method discussed above. Additional technical advantages may become apparent to a person of ordinary skill in the art in light of the detailed discussions further disclosed below.

It may also be appreciated, that various embodiments also relate to an apparatus, systems and/or methods for performing these operations. This apparatus may be specially constructed for the required purpose or it may include a general-purpose computer as selectively activated or reconfigured by a computer program or application stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an exemplary embodiment of an imaging system 100 to process information and determine estimated ambient EM radiation information, albedo map estimation and/or range map estimation in soft or hard real time. In some embodiments, the imaging system 100 may include, without limitation, a time of flight imaging device 110, an EM radiation emitter device 122 operatively coupled and/or connected to the time of flight imaging device 110, and an EM radiation sensor device 124 also operatively coupled and/or connected to the time flight device 110.

In some embodiments, the time of flight imaging device 110, may further include without limitation, a processing unit 112 and memory 114 operatively coupled to the processing unit 112, where the processing unit 112 may include, without limitation, processor circuitry. Further, the time of flight imaging device 110 may include, without limitation, one or more I/O ports 120 operatively coupled to the memory 114 and/or processing unit 112 to send and/or receive information (e.g., information encoded in digital signals, etc.) to the EM radiation emitter device 122 and/or EM radiation sensor device 124. The memory 114 may include, without limitation, an operating system 116 and a time of flight application 118.

In some embodiments, the operating system 116 may be any type of software that manages hardware resources (e.g., memory 114, processing unit 112, I/O port(s) 120, etc.), and/or software resources (e.g., semaphores, mutex, handles, applications, processes, threads, etc.). Examples of operating system 116 may include, without limitation, a Linux® based operating system, a Windows® operating system, an Apple® based operating system, real time Micro-Controller Operating Systems (μC/OS)® based operating systems, real time VxWorks® based operating systems, and so forth.

In some embodiments, the time of flight imaging device 110 may further include, without limitation, Application Specific Integrated Circuits (ASIC) and/or Field Programmable Gate Arrays (FPGA), where at least a portion of the processing unit 112, the memory 114, the operating system 116, and/or the time of flight application 118, may implemented as application specific circuitry utilizing Hardware Description Language (HDL), gate level placement tools, (e.g., netlists, etc.), and/or route tools.

Figure 2:
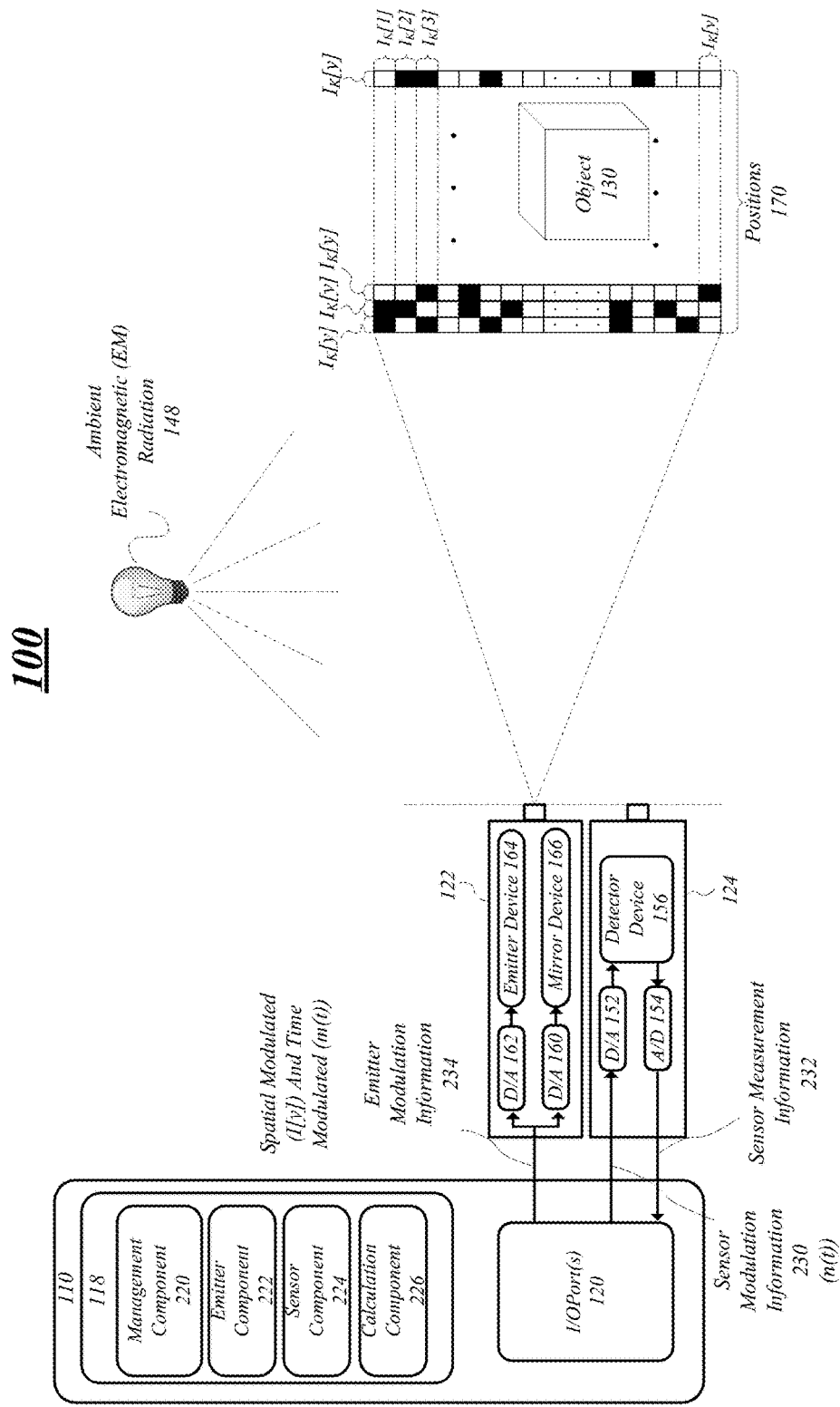
FIG. 2 illustrates a detailed embodiment of the imaging system for determining estimated ambient EM radiation information, estimated albedo information, and/or estimated range information.

In some embodiments, the time of flight application 118, further discussed with respect to FIG. 2, may be generally arranged to determine estimated ambient EM radiation information, albedo map estimation and/or range map estimation in soft or hard real time based at least partially on information provided to and/or received from the EM radiation emitter device 122 and EM radiations sensor device 124.

In some embodiments, the I/O port(s) 120 may include circuitry, such as a transceiver, to communicate information as one or more packets, frames, or any other unit of information encoded in signals that is sent to and/or received from an operatively coupled device (e.g., the EM radiation emitter device 122, the EM radiation sensor device 124, etc.). The embodiments are not limited in this manner.

It may be appreciated that while an illustrative implementation is provided and discussed with respect to the figures, the imaging system 110 may implemented by any type of computing device or embedded computing device which may include, without limitation, a computer, a desktop computer, a laptop, a tablet, a telephone including a cellular telephones, a smart telephone, a personal digital assistant, a Field-Programmable Gate Array (FGPA) Mezzanine card (FMC), a Digital Signal Processing (DSP) daughter card, a server, a rack mounted server, a blade server, or any other type of server. The embodiments are not limited in this manner.

In some embodiments, the EM radiation emitter device 122 may include, without limitation, a digital to analog (D/A) converter device 162 operatively coupled to the emitter device 164 to convert information received from the time of flight imaging device 110 to analog signals to control the emitter device 164. The emitter device 164 may include, without limitation, circuitry and/or optics for emitting EM radiation towards a mirror device 166 in the EM spectrum (e.g., visible light, infrared, ultraviolet, gamma rays, X rays, microwaves, radio waves, etc.) having an associated EM radiation emission intensity. The emitter device 164 may be configured to emit EM radiation in accordance with time emitter modulation function m(t) further discussed with respect to FIGS. 2, 3A, and 3B.

In some embodiments, the EM radiation emitter device 122 may further include, without limitation, a D/A converter device 160 to convert information received from the time of flight imaging device 110 to analog signals to control the mirror device 166. The mirror device 166 may include, without limitation, circuitry and/or optics operatively coupled to one or more mirrors for deflecting most (e.g., approximately 80% or more of the EM radiation emitted by the emitter device 164, etc.), if not all, of the EM radiation emitted by the emitter device 164 in one or more angles or phases towards an aperture or opening in the EM radiation emitter device 122 having an associated focal center ($fc_1$) 140.

Figure 3A:
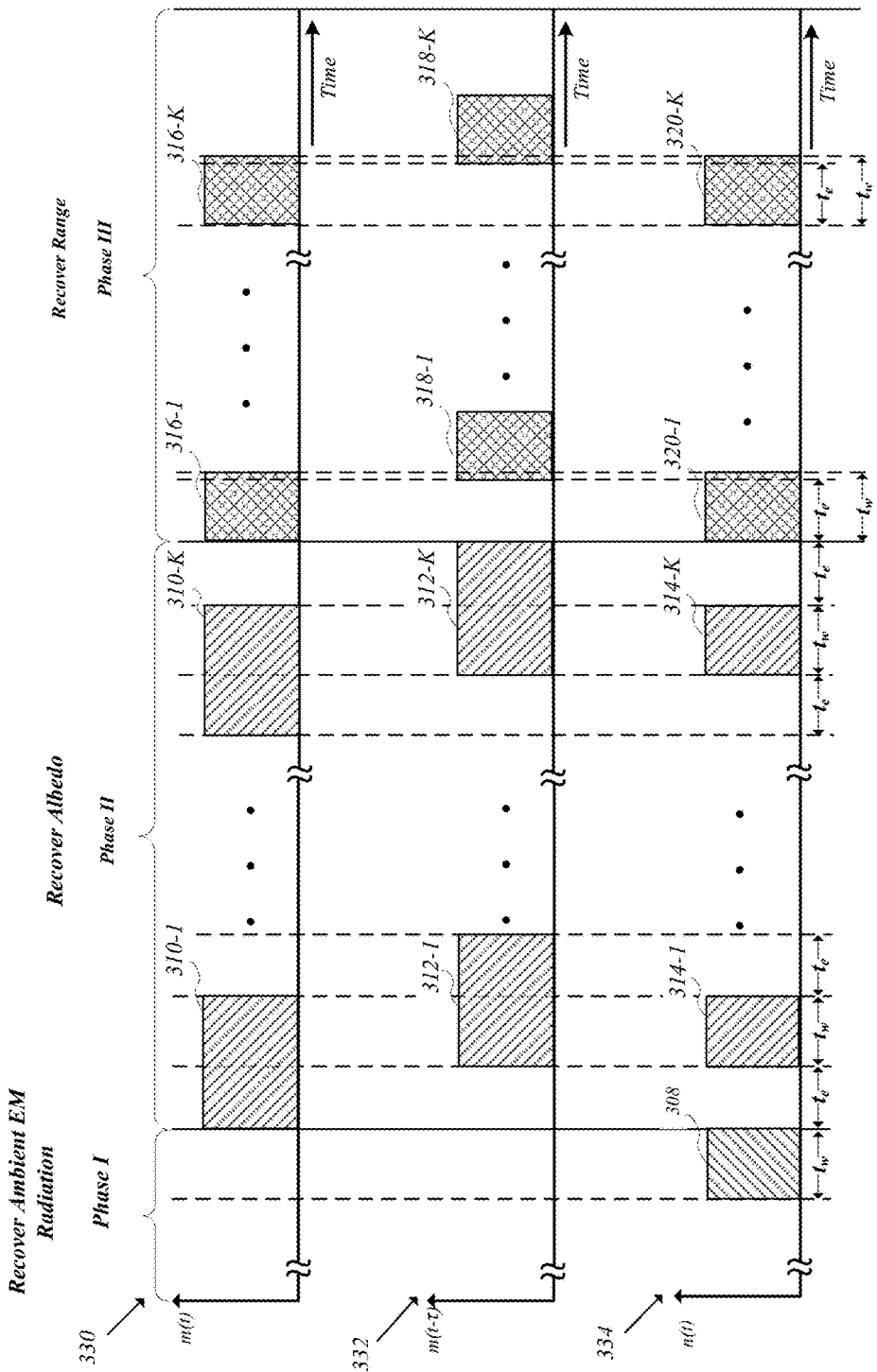
FIGS. 3A-3B illustrate embodiments of timing diagrams for modulating an electromagnetic radiation emitter device and modulating an electromagnetic radiation sensor device.
Figure 3B:
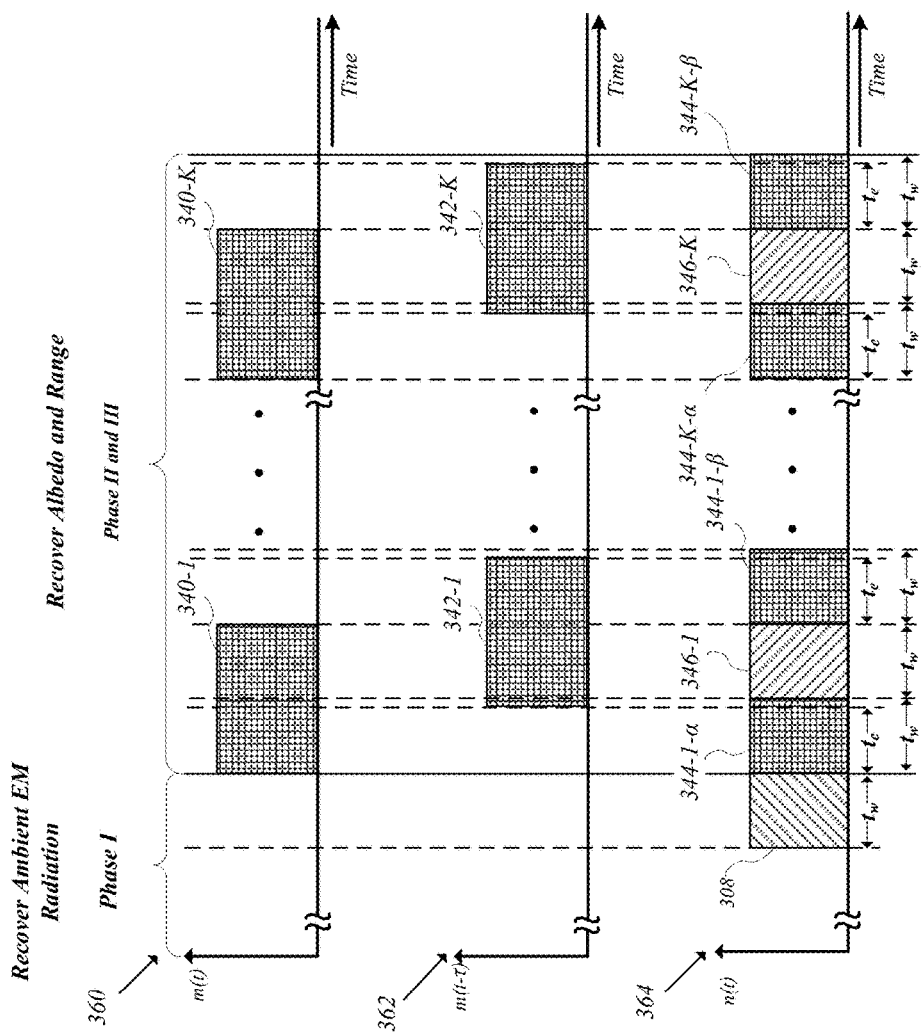

In some embodiments, the mirror device 166 may be configured to deflect the EM radiation emitted by the emitter device 164 as a structured pattern that may include, without limitation, one or spatially modulated projections 150 more (e.g., K spatially modulated projections, etc.) along the vertical axis $I_K[y]$, at one or more different positions 170 (e.g., W different vertical positions, etc.) for reconstructing a 2D albedo image and/or 2D range image having an image size of Width (W)×Height (R) (e.g., 640 (W)×480 (R) resolution image, etc.) further discussed with respect to FIGS. 2, 3A, and 3B.

Additionally or alternatively, the mirror device 166 may also be configured to deflect the EM radiation emitted by the emitter device 164 as a structured pattern that may include, without limitation, one or more spatially modulated projections along the horizontal axis $I_K[x]$ at one or more different positions for reconstructing a 2D albedo image and/or 2D range, or both, i.e., horizontal and vertical axis $I_K[x, y]$ as a 2D coded pattern. The embodiments are not limited in this manner.

Thus, in some embodiments, the EM radiation emitter device 122 may be configured to emit one or more spatially modulated projections 150, where each spatially modulated projection may include one or more bands (e.g., bright and/or dark bands, bright, dark, and/or grey bands, gradient brands, etc.) of EM radiation, within one or more time periods, where the intensity of the bands may be a function of the one or more elements in the sensing matrix (I) and the maximum EM radiation emission intensity P (e.g., scalar value in watts, etc.).

By way of example, the EM radiation emitter device 122 may be implemented as a scanning LASER device which may include, without limitation, a LASER emitter device and a one dimensional MEMS scanning mirror device configured to emit a structured pattern of bands along a vertical axis (e.g., the y-axis, etc.) at one or more vertical positions of W different vertical positions 170 in accordance with one or more spatially modulated projections $I_K[y]$ (e.g., K different spatially modulated projections, etc.). Moreover, the intensity of the bands in a single spatially modulated projection along the y-axis (e.g., $I_1[y]$, etc.) may be a function of the values (e.g., values between zero and one, etc.) of one or more pseudo random numbers (e.g., R pseudo random numbers, etc.) in a row (e.g., $1^{st}$ row, $2^{nd}$ row ... $K^{th}$ row, etc.) of a sensing matrix or dimension reduction matrix (I) further discussed with respect to FIG. 2. The scanning LASER device may be further modulated with respect to a time emitter modulation function m(t), such that the one or more spatially modulated projections $I_K[y]$ may be emitted within one or more time periods as identified by time emitter modulation function m(t) and further discussed with respect to FIGS. 2, 3A, and 3B.

In some embodiments, the EM radiation sensor device 124 may include, without limitation, a digital to analog (D/A) converter device 152 operatively coupled to the detector device 156 and the time of flight imaging device 110 to convert information received from the time of flight imaging device 110 to analog signals to control the detector device 156. In some embodiments, the detector device 156 may include, a binary gate (e.g., a Metal Oxide Semiconductor Field Effect Transistor (MOSFET), etc.)(not shown) and/or electronic shutter device (not shown) to modulate the deflection of the EM radiation in accordance with time sensor modulation function n(t) within one or more time periods further discussed with respect to FIGS. 2, 3A, and 3B. Additionally or alternatively, the detector device 156 may be configured to modulate the detection of EM radiation in accordance with time sensor modulation function n(t) within one or more time periods by modulating the power supplied to the detector device 156. The EM radiation may include, without limitation, ambient EM radiation 148, EM radiation emitted by the EM radiation emitter device 122 and reflected back, or any other sources of EM radiation.

To detect the EM radiation, the detector device 156 may include, without limitation, circuitry and/or optics for receiving EM radiation via an aperture within a limited field of view (e.g., 60 degrees, 80 degrees, etc.) and associated focal center ($fc_2$) 142. Additionally or alternatively, the detector device 156 may also include, without limitation, circuitry and/or optics via an aperture for omni-directional receipt of EM radiation. In some embodiments, the EM radiation sensor device 124 may further include, without limitation, an analog to digital (A/D) converter device 154 operatively coupled to the detector device 156 and time of flight imaging device 110, and may convert the signals generated by the detector device 156 that represents the detected EM radiation into digital signals transmitted to the time of flight imaging device 110.

In some embodiments, the apertures of the EM radiation emitter device 122 and EM radiation sensor device 124 may be positioned substantially the same distance (e.g., less than one (1) mm difference, etc.) from one or more surfaces of one or more objects in a medium such, as, for example, object 130. In embodiments where the EM radiation emitter device 122 is associated with the focal center (fc$_1$) 140 and the EM radiation sensor device 124 is associated with the focal center (fc$_2$) 142, the EM radiation emitter device 122 and the EM radiation sensor device 124 may be positioned so that distance from the apertures of the EM radiation emitter device 122 and EM radiation sensor device 124 to one or more surfaces of the object 130, i.e., distance to surface (d$_s$) 144 may be less than the distance between the focal center (fc$_1$) 140 and the focal center (fc$_2$) 142, i.e., the focal center distance (fcd) 146.

Additionally or alternatively, in embodiments where the apertures of the EM radiation emitter device 122 and EM radiation sensor device 124 share a joint focal center 147, or the EM radiation sensor device 124 is configured with circuitry and/or optics with omni-directional receipt of EM radiation, the EM radiation emitter device 122 and EM radiation sensor device 124 may be positioned regardless of the distance to surface (d$_s$) 144 with respect to the distance between the focal center (fc$_1$) 140 and the focal center (fc$_2$) 142.

FIG. 2 illustrates a detailed embodiment of the imaging system 100 for determining estimated ambient EM radiation information, estimated albedo information, and/or estimated range information. In some embodiments, the time of flight application 118 may further include, without limitation, a management component 220, an emitter component 222, a sensor component 224, and/or a calculation component 226. It may be appreciated that the time of flight application 118 and/or one or more components of the time of flight application 118 may be implemented as one or more dynamic link libraries, static libraries, functions, classes. Additionally or alternatively, at least a portion of the time of flight application 118 and/or one or more components of the time of flight application 118 may also be implemented utilizing hardware components such as, for example, logic gates, circuitry, and the like. The implementations are not limited in this manner.

In some embodiments, the management component 220 may be generally arranged to generate albedo map estimation and/or range map estimation utilizing the emitter component 222, sensor component 224 and/or calculation component 226. In some embodiments, the albedo map estimation may include, without limitation, a two dimensional (2D) albedo image represented by a two dimensional matrix having a specific resolution, such as, for example, a two dimensional matrix that may include, without limitation, a 640 (i.e., width (W)) columns by 480 (i.e., height (R)) rows of elements, where each element in the matrix, which may correspond to a pixel in the albedo image, may be representative of an estimated albedo. Similarly, the range map estimation may include, without limitation, a 2D range image represented by a two dimensional matrix having a specific resolution, such as, for example, a two dimensional matrix that may include, without limitation, a 640 columns (i.e., Width (W)) by 480 rows (i.e., height (R)) of elements, where each element in the matrix, which may correspond to a pixel in the range image, may be representative of an estimated range or depth. In some embodiments, the 2D range image and/or 2D albedo image may be continuously updated or refreshed at a specific frequency, such as, for example, at 60 times per second in soft or hard real time.

To generate albedo map estimation and/or range map estimation, the management component 220 may be configured to determine each column in a 2D albedo image and/or 2D range image, where the standard radiometric calculations may be determined for each column by projecting K spatially modulated projections along the y-axis (I$_K$[y]), which may be given by the following form of sensor irradiance equation (Equation (A1)):

$$b = \int_t n(t)(\int_y I(y)a(y)m(t-\tau(y))dy + \gamma)dt$$

where γ may be representative of the ambient EM radiation 148 (i.e., ambient EM radiation); b may be represented by the sensor measurement information 232 received from the EM radiation sensor device 124; n(t) may be representative of the sensor modulation function with respect to time and may be represented by sensor modulation information 230 transmitted to the EM radiation sensor device 124; I(y) may be representative of the spatial modulation function with respect to a vertical axis (e.g., y axis, etc.) and may be represented by at least a portion of the emitter modulation function 234; m(t) may be representative of the emitter modulation function with respect to time (i.e., time emitter modulation function) and may also be represented by the emitter modulation information 234 transmitted to the EM radiation emitter device 122; and τ(y) may be representative of the travel time of the emitted EM radiation from a joint focal center 147 associated with the EM radiation emitter device 122 to one or more surfaces of object 130 and reflected back to the EM radiation sensor device 124 (i.e., the travel time information) or from focal center (fc$_1$) 140 associated with the EM radiation emitter device 122 to the object 130 and reflected back to focal center (fc$_2$) 142 associated with the EM radiation sensor device 124 (i.e., the travel time information).

In some embodiments, d(y) may be representative of the range or distance to the object 130 from the focal center (fc$_1$) 140 of the EM radiation emitter device 122 and may be evaluated by the following equation (Equation (A2)):

$$\tau(y) = \frac{d(y)}{c}$$

where τ(y) may be representative of the travel time information discussed above; and c may be representative of the speed of the EM radiation in the medium between the EM radiation emitter device 122 and the object 130, such as, for example, the speed of light which is 299,792,458=m/s. Equation (A1) may be further arranged to the following equation (Equation (A3)):

$$b = \int_y I(y)a(y) \int_t n(t)m(t-\tau(y))dtdy + \int_t n(t)\gamma dt$$

which may still be further arranged as the following equation (Equation (A4)) utilizing convolution integral or super position integral:

$$b = \int_y I(y)a(y)(n*m)(\tau(y))dy + \int_t n(t)\gamma dt$$

where γ may be representative of the ambient EM radiation 148 as previously discussed; a(y) maybe representative of the albedo, and τ(y) may be representative of the travel time or delay for which the range or distance may be determined or calculated utilizing Equation (A2). Additionally, by examining K spatially modulated projections, Equation (A4) may be further arranged as (Equation (A5)):

$$b_K = \int_y I_K(y)a(y)(n*m)(\tau(y))dy + \int_t n(t)\gamma dt$$

In some embodiments, the time of flight device 110 and in particular the calculation component 226 of the time of flight device 110 may be configured to determine the ambient EM radiation information ($\gamma$), the albedo information $a(y)$, and/or the range information ($\tau(y)$), in accordance with Equation (A5).

Estimating Ambient EM Radiation

To determine an estimate of the ambient EM radiation information ($\hat{\gamma}$) (i.e., estimated ambient EM radiation information), in some embodiments, the emitter component 222 may configure the EM radiation emitter device 122 to emit EM radiation by providing ambient recovery emitter modulation information to the EM radiation emitter device 122, where the ambient recovery emitter modulation information may be generated in accordance with the time emitter modulation function m(t) set to (Emitter Modulation Function (E1)):

$$m(t)=0$$

where the scalar value of zero (0) may be representative of the EM radiation emitter device 122 configured not to emit any EM radiation.

In some embodiments, the sensor component 224 may configure the EM radiation sensor device 124 to detect or capture ambient EM radiation by providing ambient recovery sensor modulation information to the EM radiation sensor device 124, where the ambient recovery sensor modulation information may be generated in accordance with sensor modulation function n(t) set to (Sensor Modulation Function (S1)):

$$n(t) = \begin{cases} 1; & 0 < t < t_w \\ 0; & \text{otherwise} \end{cases}$$

where the scalar value of one (1) may be representative of the EM radiation sensor device 124 configured to detect or capture EM radiation and the scalar value of zero (0) may be representative of the EM radiation sensor device 124 configured to not detect or capture EM radiation; and $t_w$ may be representative of the sensing window period discussed above.

In response, the EM radiation sensor device 124 may provide a sensor measurement represented by sensor measurement information ($b^{Ambient}$) 232 and representative of the detected or captured ambient EM radiation (i.e., ambient recovery sensor measurement information) to the sensor component 224 of the time of flight application 118. Additionally, the sensor component 224 may receive the ambient recovery sensor measurement information via I/O port(s) 120 and store the received ambient recovery sensor measurement information in, for example, memory 114.

In some embodiments, $t_w$ may be representative of a sensing window period and may be determined and set based at least partially on the imaging system's 100 total range. In one non-limiting example, $t_w$ may be determined by (Equation (B1)):

$$t_w = t_e + t_m$$

where $t_e$ may be representative of the maximum reflective period, i.e., the maximum time required for the EM radiation emitted from EM radiation emitter device 122 to reach the object 130 and reflected back to the EM radiation sensor device 124 or stated differently, the maximum time to receive an EM radiation echo from an object that is furthest away from the EM radiation emitter device 122 and EM radiation sensor device 124; and $t_m$ may be representative of the inherent system period which may be determined or derived from dynamic range and noise sensitivity of the imaging system 100.

In some embodiments, the correlation function between the EM radiation emitter device 122 and the EM radiation sensor device 124 may be set to:

$$(n*m)(t)=0$$

and Equation (A4) may be transformed to (Equation (B2)):

$$b^{Ambient} = \int_0^{t_w} \hat{\gamma} dt \stackrel{\Delta}{=} H$$

which may be further transformed to (Equation (B3)):

$$b^{Ambient} = \hat{\gamma} t_w \stackrel{\Delta}{=} H$$

where $\hat{\gamma}$ may be representative of the estimated ambient EM radiation; $b^{Ambient}$ may be representative of the ambient recovery sensor measurement information received from EM radiation sensor device 124; and $t_w$ may be representative of the sensing window period as discussed above.

In some embodiments, the calculation component 226 of the time of flight application 118 may be configured to determine or calculate the estimated ambient EM radiation ($\hat{\gamma}$) in accordance with Equation (B3) based on the sensing window period $t_w$ and stored ambient recovery sensor measurement information b.

Estimating Albedo

To determine the estimated albedo information ($\hat{a}$), in some embodiments (e.g., embodiments further discussed with respect to FIG. 3A), the emitter component 222 may configure the EM radiation emitter device 122 to emit EM radiation as K spatially modulated projections $I_K[y]$ by providing albedo emitter recovery modulation information to EM radiation emitter device 122, where the albedo emitter recovery modulation information may be generated in accordance with the time emitter modulation function m(t) set to (Emitter Modulation Function (E2)):

$$m(t) = \begin{cases} P; & 0 < t < t_w + t_e \\ 0; & \text{otherwise} \end{cases}$$

where P (e.g., a scalar value, etc.) may be representative of the maximum EM radiation emission intensity, i.e., the maximum output power of the EM radiation emitter device 122; $t_w$ may be representative of the sensing window period discussed above; and $t_e$ may be representative of the maximum reflective period also discussed above.

Additionally, the sensor component 224 may configure the EM radiation sensor device 124 to detect or capture the EM radiation emitted by the EM radiation emitter device 122 and reflected back to the EM radiation sensor device 124 by providing albedo recovery sensor modulation information to the EM radiation sensor device 124, where the albedo recovery sensor modulation information may be generated in accordance with sensor modulation function n(t) set to (Sensor Modulation Function (S2)):

$$n(t) = \begin{cases} 1; & t_e < t < t_w + t_e \\ 0; & \text{otherwise} \end{cases}$$

where the scalar value of one (1) may be representative of the EM radiation sensor device 124 configured to detect or capture EM radiation and the scalar value of zero (0) may be representative of the EM radiation sensor device 124 configured to not detect or capture EM radiation discussed above; $t_e$ may be representative of the maximum reflective period also discussed above; and $t_w$ may be representative of the sensing window period discussed above.

In response, the EM radiation sensor device 124 may provide one or more sensor measurements ($b_1, b_2, b_3, \ldots b_K$) NO represented by sensor measurement information ($b_K^{Albedo}$) 232 and representative of the detected or captured EM radiation (i.e., albedo recovery sensor measurement information) to the sensor component 224 of the time of flight application 118. The sensor component 224 may also receive the albedo recovery sensor measurement information via I/O port(s) 120 and store the received albedo recovery sensor measurement information in, for example, memory 114.

Additionally or alternatively, in some embodiments (e.g., embodiments further discussed with respect to FIG. 3B), the emitter component 222 may configure the EM radiation emitter device 122 to emit EM radiation as K spatially modulated projections $I_K[y]$ by providing albedo and range recovery emitter modulation information (i.e., combined recovery emitter modulation information) to EM radiation emitter device 122, where the combined recovery emitter modulation information may be generated in accordance with the time emitter modulation function m(t) set to (Emitter Modulation Function (E3)):

$$m(t) = \begin{cases} P; & 0 < t < 2t_w \\ 0; & \text{otherwise} \end{cases}$$

where P (e.g., a scalar value, etc.) may be representative of the maximum EM radiation emission intensity, i.e., the maximum output power of the EM radiation emitter device 122 as discussed above; and $t_W$ may be representative of the sensing window period discussed above. In some embodiments, the sensor component 224 may configure the EM radiation sensor device 124 to detect or capture the EM radiation emitted by the EM radiation emitter device 122 and reflected back to the EM radiation sensor device 124 by providing combined sensor modulation information, which may include, without limitation, albedo recovery sensor modulation information, to the EM radiation sensor device 124.

Additionally, the albedo recovery sensor modulation information of the combined sensor modulation information may be generated in accordance with sensor modulation function n(t) set to (Sensor Modulation Function (S3)):

$$n(t) = \begin{cases} 1; & t_w < t < 2t_w \\ 0; & \text{otherwise} \end{cases}$$

where the scalar value of one (1) may be representative of the EM radiation sensor device 124 configured to detect or capture EM radiation and the scalar value of zero (0) may be representative of the EM radiation sensor device 124 configured not to detect or capture EM radiation as discussed above; and $t_w$ may be representative of the sensing window period discussed above.

In response, the EM radiation sensor device 124 may provide one or more sensor measurements ($b_1, b_2, b_3, \ldots b_K$) represented by sensor measurement information ($b_K^{Albedo}$) 232 representative of the detected or captured EM radiation (i.e., albedo recovery sensor measurement information) to the sensor component 224 of the time of flight application 118, and sensor component 224 may receive the albedo recovery sensor measurement information via I/O port(s) 120 and store the received albedo recovery sensor measurement information in, for example, memory 114.

In some embodiments, the correlation function between the EM radiation emitter device 122 and the EM radiation sensor device 124 may be set to:

$$(n*m)(t) = Pt_w$$

and Equation (A4) may be transformed to (Equation (C1)):

$$b^{Albedo} = \int_y Pt_w I(y) a(y) dy + H$$

which may be further transformed as (Equation (C2)):

$$\frac{b^{Albedo} - H}{Pt_w} = \tilde{b}^{Albedo} = \int_y I(y) da(y) dy$$

In some embodiments, the continuous function of Equation (C2) may be transformed into a discrete function (Equation (C3)) by examining K different spatially modulated projections:

$$\tilde{b}_K^{Albedo} = \sum_y I^K[y] a(y)$$

and by projecting K different spatially modulated projections, the Equation (C3) may be further transformed to (Equation (C4)):

$$\begin{bmatrix} \tilde{b}_1^{Albedo} \\ \vdots \\ \tilde{b}_K^{Albedo} \end{bmatrix} = \begin{bmatrix} I_1 \\ \vdots \\ I_K \end{bmatrix} a$$

Utilizing compressive sensing paradigm, Equation (C4) may be further transformed to (Equation (C5)):

$$\hat{a} = \operatorname*{argmin}_a \left\| \tilde{b} - Ia \right\|_2^2 + \lambda |\Omega a|_1$$

where â may be a function of y and may be representative of estimated albedo information for a single column of a 2D albedo image having R rows as the vertical resolution of the 2D albedo image and may include R×1 elements (i.e., a vector of R elements); a may be representative of the internal search variable of the minimization problem illustrated in Equation (C5) and may include R×1 elements (i.e., a vector of R elements) and may also be a function of y; and I may be representative of a sensing matrix or dimension reduction matrix that includes K×R elements (i.e., a sensing matrix of K rows and R columns of elements), where each row of the K rows may be representative of a single spatially modulated projection of the K different spatially modulated projections ($I_1[y], I_2[y], I_3[y], \ldots I_K[y]$) 150. Additionally, each element of the sensing matrix may be a pseudo-random value constructed by the calculation component 226 based at least partially on a random sub-Gaussian distribution and may be stored in, for example, memory 114 as sensing matrix information. Further, $\Omega$ may incorporate structural data of the search variable a and may include a varying number of rows and R columns of elements, where the varying number of rows may be determined based on prior knowledge of a. For example, $\Omega$ may be representative of a derivation matrix, when a is piecewise smooth. In addition, $\lambda$ may be representative of a weighted scalar value to bias $\Omega$. Furthermore, $\tilde{b}$ may include K×1 elements (i.e., a vector of K elements) and may be representative of normalized version of the albedo recovery sensor measurement information (i.e., normalized albedo recovery sensor measurement information) which may be determined by (Equation (C6)):

$$\tilde{b} = \frac{b^{Albedo} - H}{Pt_w}$$

where $b^{Albedo}$ may be representative of the albedo recovery sensor measurement information received from EM radiation sensor device 124; H may incorporate the estimated ambient EM radiation ($\hat{\gamma}$) and may be determined based on Equation (B2) or Equation (B3) discussed above; P may be representative of the EM radiation emission intensity discussed above; and $t_W$ may be representative of the sensing window period discussed above.

In some embodiments, the calculation component 226 of the time of flight application 118 may be configured to determine or calculate the estimated albedo information (â) in accordance with Equation (C5) based on normalized albedo recovery sensor measurement information ($\tilde{b}$) including stored estimated ambient EM radiation ($\hat{\gamma}$), sensing matrix (I), weighted scalar value ($\lambda$), and derivation matrix ($\Omega$), utilizing one or more optimization and/or statistical learning algorithms, such as, for example, Lasso, Orthogonal Matching Pursuit, Alternating Direction Method of Multipliers, learning networks, and the like. Additionally, the calculation component 226 of the time of flight application 118 may be further configured to store the determined or calculated the estimated albedo information (â) in, for example, memory 114.

Estimating Range

To determine the estimated range information ($\hat{d}(y)$), in some embodiments (e.g., embodiments further discussed with respect to FIG. 3A), the emitter component 222 may configure the EM radiation emitter device 122 to emit EM radiation as K spatially modulated projections $I_K[y]$ by providing range recovery emitter modulation information to EM radiation emitter device 122, where the range recovery emitter modulation information may be generated in accordance with the time emitter modulation function m(t) set to (Emitter Modulation Function (E4)):

$$m(t) = \begin{cases} P; 0 < t < t_w \\ 0; \text{otherwise} \end{cases}$$

where P (e.g., a scalar value, etc.) may be representative of the maximum EM radiation emission intensity discussed above; and $t_W$ may be representative of the sensing window period discussed above.

In some embodiments, the sensor component 224 may configure the EM radiation sensor device 124 to detect or capture the EM radiation emitted by the EM radiation emitter device 122 and reflected back to the EM radiation sensor device 124 by providing range recovery sensor modulation information to the EM radiation sensor device 124, where the range recovery sensor modulation information may be generated in accordance with sensor modulation function n(t) set to (Sensor Modulation Function (S4)):

$$n(t) = \begin{cases} 1; 0 < t < t_w \\ 0; \text{otherwise} \end{cases}$$

where the scalar value of one (1) may be representative of the EM radiation sensor device 124 configured to detect or capture EM radiation and the scalar value of zero (0) may be representative of the EM radiation sensor device 124 configured not to detect or capture EM radiation as discussed above; and $t_w$ may be representative of the sensing window period discussed above.

In response, the EM radiation sensor device 124 may provide one or more sensor measurements (e.g., $b_1, b_2, b_3, \ldots b_K$) represented by sensor measurement information ($b_K^{Range}$) 232 and representative of the detected or captured EM radiation (i.e., range recovery sensor measurement information) to the sensor component 224 of the time of flight application 118 Additionally, the sensor component 224 may receive the range recovery sensor measurement information via I/O port(s) 120 and store the received range recovery sensor measurement information in, for example, memory 114.

Additionally or alternatively, in some embodiments (e.g., embodiments further discussed with respect to FIG. 3B), the emitter component 222 may configure the EM radiation emitter device 122 to emit EM radiation as K spatially modulated projections $I_K[y]$ by providing combined recovery emitter modulation information to EM radiation emitter device 122, where the combined recovery emitter modulation information may be generated in accordance with the time emitter modulation function m(t) set to (Emitter Modulation Function (E5)):

$$m(t) = \begin{cases} P; 0 < t < 2t_w \\ 0; \text{otherwise} \end{cases}$$

where P (e.g., a scalar value, etc.) may be representative of the EM radiation emission intensity, i.e., the output power of the EM radiation emitter device 122; and $t_w$ may be representative of the sensing window period discussed above.

In some embodiments, the sensor component 224 may configure the EM radiation sensor device 124 to detect or capture the EM radiation emitted by the EM radiation emitter device 122 and reflected back to the EM radiation sensor device 124 by providing combined sensor modulation information, which may further include, without limitation, range recovery sensor modulation information to the EM radiation sensor device 124, where the range recovery sensor modulation information of the combined sensor modulation information may be generated in accordance with sensor modulation function set to (Sensor Modulation Function (S5)):

$$n(t) = \begin{cases} 1; & 0 < t < t_w \\ 1; & 2t_w < t < 3t_w \\ 0; & \text{otherwise} \end{cases}$$

where the scalar value of one (1) may be representative of the maximum EM radiation emission intensity discussed above; and $t_w$ may be representative of the sensing window period also discussed above.

In response, the EM radiation sensor device 124 may provide sensor measurement information ($b_K^{Partial\ Range\ \alpha}$ and $b_K^{Partial\ Range\ \beta}$) 232 representative of the detected or captured EM radiation (i.e., first partial range recovery sensor measurement information and second partial range recovery sensor measurement information) to the sensor component 224 of the time of flight application 118. Additionally, the sensor component 224 may receive the first and second partial range recovery sensor measurement information via I/O port(s) 120 and store the received first and second partial range recovery sensor measurement information in, for example, memory 114. Further, the calculation component 226 may be further configured to determine range recovery sensor measurement information ($b_K^{Range}$) utilizing Equation (E6) further discussed with respect to FIG. 3B.

In some embodiments, the correlation function between the EM radiation emitter device 122 and the EM radiation sensor device 124 may be set to:

$$(n*m)(t) = \begin{cases} (t_w + t)P; & -t_w < t < 0 \\ (t_w - t)P; & 0 < t < t_w \\ 0; & \text{otherwise} \end{cases}$$

and Equation (A4) may be transformed to (Equation (D1)):

$$b^{Range} = \int_y I(y)a(y)(n*m)(\tau(y))dy + H$$

which may be further transformed as (Equation (D2)):

$$b^{Range} = \int_y I(y)a(y)P(t_w - \tau(y))dy + H$$

which may be further transformed as (Equation (D3)):

$$\frac{b^{Range} - H}{P} = \tilde{b}^{Range} = \int_y I(y)a(y)P(t_w - \tau(t))dy$$

Additionally, by setting (Equation (D4)):

$$\tilde{I}(y) = I(Y)a(y)$$

and setting (Equation (D5)):

$$\tilde{\tau}(y) = t_w - \tau(y)$$

Equation (D3) may be further transformed to (Equation (D6)):

$$\tilde{b}^{Range} = \int_0^{t_w} \tilde{I}(y)\tilde{\tau}(y)dy$$

where $\tilde{I}(y)$ may be representative of the normalized version of the spatial modulation function $I(y)$; and $\tilde{\tau}(y)$ may be representative of the normalized version of the travel time or delay information $\tau(y)$ (i.e., normalized travel time information).

In some embodiments, the continuous function of Equation (D4) may be transformed into a discrete function by examining K different spatially modulated projections (Equation (D7)):

$$\tilde{b}_K^{Range} = \sum_y \tilde{I}^K[y]\tilde{\tau}(y)$$

and by projecting K different spatially modulated projections, the Equation (D7) may be further transformed to (Equation (D8)):

$$\begin{bmatrix} \tilde{b}_1^{Range} \\ \vdots \\ \tilde{b}_K^{Range} \end{bmatrix} = \begin{bmatrix} \tilde{I}_1 \\ \vdots \\ \tilde{I}_K \end{bmatrix} \tilde{\tau}$$

Utilizing compressive sensing paradigm, Equation (D8) may be further transformed to (Equation (D9)):

$$\hat{\tilde{\tau}} = \arg\min_{\tilde{\tau}} \|\tilde{b} - \tilde{I}\tilde{\tau}\|_2^2 + \lambda |\Omega\tilde{\tau}|_1$$

where $\hat{\tilde{\tau}}$ may be representative of estimated and normalized travel time information for a single column of a 2D range image having R rows as the vertical resolution and may include R×1 elements (i.e., a vector of R elements); $\tilde{\tau}$ may be representative of the internal search variable of the minimization problem illustrated in Equation (D7) and may include R×1 elements (i.e., a vector of R elements) and may be a function of y; and $\tilde{I}$ may be representative of a normalized version of the sensing matrix or dimension reduction matrix I (i.e., normalized sensing matrix) incorporating the estimated albedo information (â) which may be determined by Equation (C5), and the sensing matrix I may include K×R elements (i.e., a sensing matrix of K rows and R columns of elements), where each row of the K rows may be representative of a single spatially modulated projection of the K different spatially modulated projections ($I_1[y]$, $I_2[y]$, $I_3[y]$, . . . $I_K[y]$) 150. Additionally, each element of the sensing matrix may be a pseudo-random value constructed by the calculation component 226 based at least partially on a random sub-Gaussian distribution and may be stored as sensing matrix information. Further, $\Omega$ may incorporate structural data of the search variable $\tilde{\tau}$ and may include a varying number of rows and R columns of elements, where the varying number of rows may be determined based on prior knowledge of $\tilde{\tau}$. For example, $\Omega$ may be representative of a prior matrix, when $\tilde{\tau}$ is piecewise smooth. In addition, $\lambda$ may be representative of a weighted scalar value to bias $\Omega$. Furthermore, $\tilde{b}$ may include K×1 elements (i.e., a vector of K elements) and may be representative of normalized version of the range recovery sensor measurement information (i.e., normalized range recovery sensor measurement information) which may be determined by (Equation (D10)):

$$\tilde{b} = \frac{b^{Range} - H}{P}$$

where $b^{Range}$ may be representative of the range recovery sensor measurement information; H may incorporate the estimated ambient EM radiation ($\hat{\gamma}$) and may be determined based on Equation (B2) or Equation (B3) discussed above; and P may be representative of the EM radiation emission intensity also discussed above.

In some embodiments, the calculation component 226 of the time of flight application 118 may be configured to determine or calculate the estimated range information $\hat{d}(y)$ by first determining estimated and normalized travel time information $\hat{\tilde{\tau}}$ in accordance with Equation (D9). Moreover, the estimated and normalized travel time information $\hat{\tilde{\tau}}$ may be determined based on stored normalized range recovery sensor measurement information ($\tilde{b}$) including stored estimated ambient EM radiation ($\hat{\gamma}$), normalized sensing matrix ($\tilde{I}$) including stored estimated albedo information ($\hat{a}$), weighted scalar value ($\lambda$), and prior matrix ($\Omega$), utilizing one or more optimization and/or statistical learning algorithms, such as, for example, Lasso, Orthogonal Matching Pursuit, Alternating Direction Method of Multipliers, learning networks and the like.

In some embodiments, the calculation component 226 of the time of flight application 118 may be configured to determine or calculate the estimated range information $\hat{d}(y)$, by further determining or calculating estimated travel time information $\hat{\tau}$ utilizing Equation (D5) and finally determining estimated range information $\hat{d}(y)$ utilizing Equation (A2). The calculation component 226 of the time of flight application 118 may be configured to store the determined or calculated estimated range information $\hat{d}(y)$ in, for example, memory 114.

FIGS. 3A and 3B illustrate embodiments of timing diagrams for modulating an EM radiation emitter device 122 and modulating an EM radiation sensor device 124 to generate 2D albedo images and/or 2D range images. In particular, FIG. 3A illustrates a first embodiment of timing diagrams for modulating an EM radiation emitter device 122 and modulating an EM radiation sensor device 124 to generate 2D albedo images and/or 2D range images. Furthermore, FIG. 3B illustrates a second embodiment of the timing diagrams for modulating an EM radiation emitter device 122 and modulating an EM radiation sensor device 124 to generate 2D albedo images and/or 2D range images.

As illustrated in FIG. 3A, the timing diagrams may include, without limitation, emitter modulation timing diagram 330, reflected EM radiation timing diagram 332, and sensor modulation timing diagram 334, where each timing diagram may be separated into a Recover Ambient EM Radiation Phase (i.e., Phase I), a Recover Albedo Phase (i.e., Phase II), and a Recover Range Phase (i.e., Phase III). As illustrated in FIG. 3B, the timing diagrams may include, without limitation, emitter modulation timing diagram 360, reflected EM radiation timing diagram 362, and sensor modulation timing diagram 364, where each timing diagram may be separated into a Recover Ambient EM Radiation Phase (i.e., Phase I) and a combined Recover Albedo and Range Phase (i.e., Phase II and III).

In some embodiments, the timing diagrams of FIGS. 3A and 3B may be representative of the time of flight application 118 configured to determine a single vertical column of a 2D albedo image and/or a 2D range image having a resolution of W number of elements or pixels wide and R number of elements or pixels high (i.e., W×R resolution image), where a single vertical column of the 2D albedo image and/or a 2D range image may include R elements or pixels. To recover the entire 2D albedo image and/or a 2D range image, the time of flight application 118 may provide emitter modulation information 234 to the EM radiation emitter device 122 to project K spatially modulated projections $I_K[y]$ for each W different vertical positions (e.g., W different vertical positions of the object 130), so that the EM radiation may substantially scan from left to right or from right to left. Additionally, for each vertical position of the W different vertical positions, the time of flight application 118 may determine the $W^{th}$ column of the 2D albedo image and/or 2D range image based at least partially on received sensor measurement information 232 for the $W^{th}$ vertical position.

By way of example, if time of flight application 118 is configured to generate a 2D albedo image and/or a 2D range image having a resolution of 640×480 (e.g., a VGA image), then the timing diagrams of FIG. 3A may be representative of the time of flight application 118 providing emitter modulation information 234 to the EM radiation emitter device 122 to project K spatially modulated projections $I_K[y]$ at a first vertical position (e.g., first vertical position on the object 130, etc.) of 640 vertical positions and determining the first column of the 640 columns of the 2D albedo image and/or 2D range image based on received sensor measurement information 232 for the first vertical position, where each column of the 2D albedo image and/or 2D range image may include 480 elements or pixels.

In order to recover the second column of a 2D albedo image and/or 2D range image in the above example, the time of flight application 118 may further provide emitter modulation information 234 to the EM radiation emitter device 122 to project K spatially modulated projections $I_K[y]$ at a second position (e.g., the next adjacent vertical position to the first vertical position on the object 130, etc.) of 640 vertical positions and determine the second column of the 640 columns of the 2D albedo image and/or 2D range image based on received sensor measurement information 232 for the second vertical position. Thus, to recover the entire 2D albedo image and/or 2D range image, the above steps, process, method, and/or operations may be repeated for each column of the 2D albedo image and/or 2D range until the entire 640 columns of the 2D albedo image and/or 2d range image have been determined.

Continuing with the above example, the time of flight application 118 may be further configured to recover the 2D albedo image and/or the 2D range image at a frequency of 60 images per second or 60 frames per second. In such embodiments, the time for generating a single column of the 640 columns may be approximately $$\frac{\frac{1}{60}}{640} = 26 \ \mu sec.$$

Additionally, assuming 480 rows per column, using compressed sensing paradigm, the compression ratio may be assumed to be approximately 1:10. To provide a greater margin of error, a compression ratio of 1:5 may be assumed. Moreover, assuming a compression ratio of 1:5, to determine a single column comprising 480 pixels of a 2D range image, approximately one hundred (100) EM radiation sensor measurements may be required. As such, the time for each EM radiation measurement may be $$\frac{26 \ \mu sec}{100} = 260 \ nsec.$$

In embodiments where each EM radiation measurement may be composed of generally three (3) equal sensing window periods, each sensing window period $t_w$ may be approximately $t_w$=86 nsec.

It may be appreciated that while the above example has been provided for projecting K spatially modulated projections $I_K[y]$ for each W different vertical positions, the EM radiation emitter device 122 may also be configured to projecting K spatially modulated projections $I_K[x]$ with respect to the horizontal axis for R different horizontal positions, or projecting K spatially modulated projections $I_K[x, y]$ with respect to both the horizontal and vertical axis.

FIG. 3A—Recover Ambient EM Radiation (Phase I)

To recover ambient EM radiation (e.g., estimated ambient EM radiation ($\hat{\gamma}$)) in Phase I, in some embodiments, the emitter component 222 may provide emitter modulation information 234 to the EM radiation emitter device 122, where the emitter modulation information 234 may include, without limitation, ambient emitter modulation information generated in accordance with Emitter Modulation Function (E1) during the recovery of ambient radiation in Phase I of timing diagram 330.

In some embodiments, the sensor component 224 may provide sensor modulation information 230 to the EM radiation sensor device 124, where the sensor modulation information 230 may include, without limitation, ambient recovery sensor modulation information generated in accordance with Sensor Modulation Function (S1) during Phase I of timing diagram 334 to activate the EM radiation sensor device 124 for an ambient sensing period 308 to detect or capture an ambient EM radiation sensor measurement represented by ambient recovery sensor measurement information ($b^{Ambient}$) The ambient sensing period 308 may have an associated duration of a sensing window period ($t_w$).

It may be appreciated that because EM radiation emitter device 122 may not be configured to emit any EM radiation as indicated by timing diagram 330 and accordingly, no EM radiation emitted by the EM radiation emitter device 122 may be reflected back to the EM radiation sensor device 124 as indicated by timing diagram 332.

FIG. 3A—Recover Albedo (Phase II)

To recover albedo (e.g., estimated albedo information ($\hat{a}$)) in Phase II, in some embodiments, the emitter component 222 may provide emitter modulation information 234 to the EM radiation emitter device 122, where the emitter modulation information 234 may include, without limitation, albedo emitter recovery modulation information generated in accordance with Emitter Modulation Function (E2) and spatially modulated projections (e.g., spatially modulated projections with respect to the vertical axis $I_K[y]$, with respect to the horizontal axis $I_K[x]$, or with respect to both horizontal and vertical axis $I_K[x, y]$, etc.) during Phase II of timing diagram 330. Moreover, the albedo recovery emitter modulation information during Phase II may include, without limitation, one or more albedo emission periods 310-K for a total of K albedo emission periods, where each albedo emission period (e.g., albedo emission period 310-1), may have an associated duration of the maximum reflective period ($t_e$) plus the sensing window period ($t_w$) (i.e., $t_{e+w}$=$t_e$+$t_w$) and may correspond to a single EM radiation sensor measurement (e.g., single albedo sensor measurement ($b_1^{Albedo}$) etc.).

Additionally, during each albedo emission period (e.g., albedo emission period 310-1) of the K albedo emission periods, the albedo recovery emitter modulation information may configure the EM radiation emitter device 122 to project one or more corresponding spatially modulated projections (e.g., $I_K[y]$ $I_K[x]$, $I_K[x, y]$, etc.). By way of example, during the albedo emission period 310-1, the EM radiation emitter device 122 may be configured to emit spatially modulated projection $I_1[y]$ of EM radiation, during albedo emission period 310-2 (not shown), the EM radiation emitter device 122 may be configured to emit spatially modulated projection $I_2[y]$ of EM radiation, and during albedo emission period 310-K, EM radiation emitter device 122 may be configured to emit spatially modulated projection $I_K[y]$ of EM radiation.

In some embodiments, after the EM radiation emitter device 122 emits the spatially modulated projection (e.g., spatially modulated projection $I_1[y]$) of EM radiation for at least a portion of the albedo emission period (e.g., a portion of the albedo emission period 310-1), the spatially modulated projection (e.g., spatially modulated projection $I_1[y]$) of EM radiation may be reflected back from the object 130 during one or more reflected albedo emission periods 312-K as illustrated during Phase II of the timing diagram 332. Moreover, each reflected albedo emission period (e.g., reflected albedo emission period 312-1) may correspond to an albedo emission period (e.g., albedo emission period 310-1 corresponding to reflected albedo emission period 312-1, etc.) that may be time delayed by a reflective period, where the reflective period is generally less than the maximum reflective period ($t_e$) or equal to the maximum reflective period ($t_e$) as illustrated in timing diagram 332.

In some embodiments, the sensor component 224 may provide sensor modulation information 230 to the EM radiation sensor device 124, where the sensor modulation information 230 may include, without limitation, albedo recovery sensor modulation information generated in accordance with Sensor Modulation Function (S2) during Phase II of timing diagram 334. Moreover, the albedo recovery sensor modulation information during Phase II may include, without limitation, one or more albedo sensing periods 314-K to activate the EM radiation sensor device 124 for a total of K albedo sensing periods, where each albedo sensing period (e.g., albedo sensing period 314-1) may detect or capture an albedo sensor measurement (e.g., albedo sensor measurement $b_1^{Albedo}$), for a total of K albedo sensor measurements represented by albedo recovery sensor measurement information ($b_K^{Albedo}$). Additionally, each albedo sensing period (e.g., albedo sensing period 314-1) may have an associated duration of the sensing window period ($t_w$) and may be time delayed by the maximum reflective period ($t_e$)

with respect to a beginning of a corresponding albedo emission period (e.g., albedo emission period 310-1).

It may be appreciated that by delaying the albedo sensing period (e.g., albedo sensing period 314-1) of the EM radiation sensor device 124 for the maximum reflective period ($t_e$) with respect to a beginning of a corresponding albedo emission period (e.g., albedo emission period 310-1), the EM radiation sensor device 124 may detect or capture most, if not all of the spatially modulated projection (e.g., $I_1[y]$) of EM radiation reflected back from object 130 during the entire sensing window period ($t_w$) of the albedo sensing period (e.g., albedo sensing period 314-1).

FIG. 3A—Recover Range (Phase III)

To recover range (e.g., estimated range information ($\hat{d}(y)$)) in Phase III, in some embodiments, the emitter component 222 may provide emitter modulation information 234 to the EM radiation emitter device 122, where the emitter modulation information 234 may include, without limitation, range recovery emitter modulation information generated in accordance with Emitter Modulation Function (E4) and spatially modulated projections (e.g., $I_K[y]$, $I_K[x]$, $I_K[x, y]$, etc.) during Phase III of timing diagram 330. Moreover, the range recovery emitter modulation information during Phase III may include, without limitation, one or more range emission periods 316-K for a total of K range emission periods, where each range emission period (e.g., range emission period 316-1) may have a duration of a sensing window period ($t_w$), and may correspond to a single EM radiation sensor measurement (e.g., range sensor measurement ($b_1^{Range}$)).

Additionally, during each range emission period (e.g., range emission period 316-1) of the K range emission periods, the range recovery emitter modulation information may configure the EM radiation emitter device 122 to project one or more corresponding spatially modulated projections (e.g., $I_K[y]$, $I_K[x]$, $I_K[x, y]$, etc.). By way of example, during the range emission period 316-1, the EM radiation emitter device 122 may be configured to emit spatially modulated projection $I_1[y]$ of EM radiation, during range emission period 316-2 (not shown), the EM radiation emitter device 122 may be configured to emit spatially modulated projection $I_2[y]$ of EM radiation, and during range emission period 316-K, EM radiation emitter device 122 may be configured to emit spatially modulated projection $I_K[y]$ of EM radiation.

In some embodiments, after the EM radiation emitter device 122 emits the spatially modulated projection (e.g., $I_1[y]$, $I_1[x]$, $I_1[x, y]$, etc.) of EM radiation for at least a portion of the range emission period (e.g., a portion of the range emission period 316-1), the spatially modulated projection (e.g., $I_1[y]$, $I_K[x]$, $I_K[x, y]$, etc.) of EM radiation may be reflected back from the object 130 during one or more reflected range emission periods 318-K as illustrated during phase III of the timing diagram 332. Moreover, each reflected range emission period (e.g., reflected range emission period 318-1) may correspond to an range emission period (e.g., range emission period 316-1 corresponding to a reflected range emission period 318-1) that may be time delayed by a reflective period, where the reflective period is generally less than the maximum reflective period ($t_e$) or equal to the maximum reflective period ($t_e$) as illustrated in timing diagram 332.

In some embodiments, the sensor component 224 may provide sensor modulation information 230 to the EM radiation sensor device 124, where the sensor modulation information 230 may include, without limitation, ambient recovery sensor modulation information generated in accordance with Sensor Modulation Function (S4) during Phase III of timing diagram 334. Moreover, the range recovery sensor modulation information during Phase III may include, without limitation, one or more range sensing periods (e.g., range sensing period 320-1) for a total of K range sensing periods 320-K, where each range sensing period (e.g., range sensing period 320-1) may detect or capture an range sensor measurement (e.g., range sensor measurement $b_1^{Range}$), for a total of K range sensor measurements represented by sensor measurement information ($b_K^{Range}$). Additionally, each range sensing period (e.g., range sensing period 320-1), may have an associated duration of the sensing window period ($t_w$) and may be substantially contemporaneous (e.g., less than 6.7 psec for a resolution of 1 mm) of a corresponding range emission period (e.g., range emission period 316-1).

It may be appreciated that by activating the EM radiation sensor device 124 for a range sensing period (e.g., range sensing period 320-1 . . . range sensing period 320-K) that is substantially contemporaneous or simultaneous with the corresponding range emission period (e.g., range emission period 316-1 . . . range emission period 316-K), the EM radiation sensor device 124 may detect or capture at least a portion the spatially modulated projection (e.g., $I_1[y]$) of EM radiation reflected back from object 130 during the sensing window period ($t_w$) of the range sensing period (e.g., range sensing period 320-1).

It may be further appreciated that the overlapping area between a reflected range emission period (e.g., reflected range emission period 318-1) and a corresponding range sensing period (e.g., 320-1) may vary based at least partially on the distance to surface ($d_s$) 144. Stated differently, the amount of the spatially modulated projection (e.g., $I_1[y]$) of EM radiation reflected back from object 130 that is detected or captured by the EM radiation sensor device 124 may vary based at least partially on the distance to surface ($d_s$) 144.

Thus, in some embodiments, the closer the object 130 may be with respect to the EM radiation sensor device 124 and the EM radiation emitter device 122, the greater the overlapping area (as illustrated in Phase III of timing diagrams 332 and 334) may be between a reflected range emission period (e.g., reflected range emission period 318-1) and a corresponding range sensing period (e.g., range sensing period 320-1) and the corresponding range sensor measurement (e.g., range sensor measurement ($b_1^{Range}$)) may be higher. Alternatively, the farther away the object 130 may be with respect to the EM radiation sensor device 124 and the EM radiation emitter device 122, the smaller the overlapping area (as illustrated in Phase III of timing diagrams 332 and 334) may be between a reflected range emission period (e.g., reflected range emission period 318-1) and a corresponding range sensing period (e.g., 320-1) and the corresponding range sensor measurement (e.g., range sensor measurement $b_1^{Range}$) may be lower.

FIG. 3B—Recover Ambient EM Radiation (Phase I)

To recover ambient EM radiation (e.g., estimated ambient EM radiation ($\hat{\gamma}$)) in Phase I, in some embodiments, the emitter component 222 may provide emitter modulation information 234 to the EM radiation emitter device 122, where the emitter modulation information 234 may include, without limitation, ambient emitter modulation information generated in accordance with Emitter Modulation Function (E1) during the recovery of ambient radiation in Phase I of timing diagram 360.

In some embodiments, the sensor component 224 may provide sensor modulation information 230 to the EM radiation sensor device 124, where the sensor modulation information 230 may include, without limitation, ambient recovery sensor modulation information generated in accordance with Sensor Modulation Function (S1) during Phase I of timing diagram 364 to activate the EM radiation sensor device 124 for an ambient sensing period 308 discussed above to detect or capture an ambient EM radiation sensor measurement represented by ambient recovery sensor measurement information ($b^{Ambient}$)

It may be appreciated that because EM radiation emitter device 122 may not be configured to emit any EM radiation as indicated by timing diagram 360 and accordingly, no EM radiation emitted by the EM radiation emitter device 122 may be reflected back to the EM radiation sensor device 124 as indicated by Phase I of timing diagram 362.

FIG. 3B—Recover Albedo and Range (Phase II and III)

To recover albedo and range (e.g., estimated albedo information (â) and estimated range information ($\hat{d}(y)$)) in Phase II and III, in some embodiments, the emitter component 222 may provide emitter modulation information 234 to the EM radiation emitter device 122, where the emitter modulation information 234 may include, without limitation, albedo and range recovery emitter modulation information (i.e., combined recovery emitter modulation information) generated in accordance with Emitter Modulation Function (E3) or Emitter Modulation Function (E5) and spatially modulated projections $I_K[y]$ during Phase II and III of timing diagram 360. Moreover, the combined recovery emitter modulation information during Phase II and Phase III may include, without limitation, one or more combined emission periods 340-K for a total of K combined emission periods, where each combined emission period (e.g., combined emission period 340-1), may have an associated duration that is twice or double the sensing window period ($t_w$) (i.e., $2t_w$).

Additionally, during each combined emission period (e.g., combined emission period 340-1) of the K combined emission periods 340-K, the combined recovery emitter modulation information may configure the EM radiation emitter device 122 to project one or more corresponding spatially modulated projections $I_K[y]$. By way of example, during the combined emission period 340-1, the EM radiation emitter device 122 may be configured to emit spatially modulated projection $I_1[y]$ of EM radiation, during combined emission period 340-2 (not shown), the EM radiation emitter device 122 may be configured to emit spatially modulated projection $I_2[y]$ of EM radiation, and during combined emission period 340-K, EM radiation emitter device 122 may be configured to emit spatially modulated projection $I_K[y]$ of EM radiation.

In some embodiments, after the EM radiation emitter device 122 emits the spatially modulated projection (e.g., $I_1[y]$) of EM radiation for at least a portion of the combined emission period (e.g., a portion of the combined emission period 340-1), the spatially modulated projection (e.g., $I_1[y]$) of EM radiation may be reflected back from the object 130 during one or more reflected combined emission periods 342-K as illustrated during phase II and III of the timing diagram 362. Moreover, each reflected combined emission period (e.g., reflected combined emission period 342-1) may correspond to a combined emission period (e.g., combined emission period 340-1 corresponding to reflected combined emission period 342-1) that may be time delayed by a reflective period, where the reflective period is generally less than the maximum reflective period ($t_e$) or equal to the maximum reflective period ($t_e$) as illustrated in timing diagram 362.

In some embodiments, the sensor component 224 may provide sensor modulation information 230 to the EM radiation sensor device 124, where the sensor modulation information 230 may include, without limitation, albedo recovery sensor modulation information generated in accordance with Sensor Modulation Function (S3) during Phase II and III of timing diagram 364. Moreover, the albedo recovery sensor modulation information during Phase II and III may include, without limitation, one or more albedo sensing periods 346-K to activate the EM radiation sensor device 124 for a total of K albedo sensing periods, where each albedo sensing period (e.g., albedo sensing period 346-1) may detect or capture an albedo sensor measurement (e.g., albedo sensor measurement $b_1^{Albedo}$), for a total of K albedo sensor measurements represented by albedo recovery sensor measurement information ($b_K^{Albedo}$) Additionally, each albedo sensing period (e.g., albedo sensing period 346-1) may be time delayed by the sensing window period ($t_w$) with respect to a beginning of a corresponding combined emission period (e.g., combined emission period 340-1).

It may be appreciated that by delaying each albedo sensing period (e.g., albedo sensing period 346-1, etc.) of the EM radiation sensor device 124 by the sensing window period ($t_w$) with respect to a beginning of a corresponding combined emission period (e.g., combined emission period 340-1, etc.), the EM radiation sensor device 124 may detect or capture most, if not all of the spatially modulated projection (e.g., spatially modulated projection $I_1[y]$, etc.) of EM radiation reflected back from object 130 during the entire sensing window period ($t_w$) of the albedo sensing period (e.g., albedo sensing period 346-1, etc.).

To recover range (e.g., estimated range information ($\hat{d}(y)$)) in Phase II and III, in some embodiments, the sensor component 224 may provide sensor modulation information 230 to the EM radiation sensor device 124, where the sensor modulation information 230 may include, without limitation, range recovery sensor modulation information generated in accordance with Sensor Modulation Function (S5) during Phase II and III of timing diagram 364. Moreover, the range recovery sensor modulation information during Phase II and III may include, without limitation, one or more first partial range sensing periods 344-K-β and one or more second partial range sensing periods 344-K-α for a total of K pairs of partial range sensing periods.

In some embodiments, each of the first partial range sensing period (e.g., partial range sensing period 344-K-α) and each of the second partial range sensing period (e.g., second partial range sensing period 344-K-β) may form a pair of partial range sensing periods. Each of the first partial sensing periods 344-K-α may activate the EM radiation sensor device 124 for a total of K first partial range sensing periods during Phase II and III, where each first partial range sensing period (e.g., first partial range sensing period 344-1-α) may detect or capture a range sensor measurement (e.g., range sensor measurement $b_1^{Partial\ Range\ \alpha}$), for a total of K first partial range sensor measurements represented by first partial range recovery sensor measurement information ($b_K^{Partial\ Range\ \alpha}$). Similarly, each of the second partial sensing periods 344-K-β may activate the EM radiation sensor device 124 for a total of K second partial range sensing periods during Phase II and III, where each second partial range sensing period (e.g., second partial range sensing period 344-1-β) may detect or capture a range sensor measurement (e.g., range sensor measurement $b_1^{Partial\ Range\ \beta}$), for a total of K second partial range sensor measurements represented by second partial range recovery sensor measurement information ($b_K^{Partial\ Range\ \beta}$).

To determine one or more range sensor measurements (e.g., range sensor measurement $b_1^{Range}$), represented by range recovery sensor measurement information (range sensor measurement $b_K^{Range}$, etc.) for calculating the estimated and normalized travel time information ($\hat{\tau}$) utilizing Equation (D9) and Equation (D10), the calculation component 226 may be further configured to determine one or more range sensor measurements ($b_K^{Range}$) utilizing (Equation (E6)):

$$b_K^{Range} = b_K^{Partial\ Range\ \alpha} + b_K^{Albedo} - b_K^{Partial\ Range\ \beta}$$

In some embodiments, each of the first partial range sensing period and second partial range sensing period may also have a duration of the sensing window period ($t_w$) and may be separated by a corresponding albedo sensing period (e.g., albedo sensing period 346-K). Additionally, each first partial range sensing period (e.g., first partial range sensing period 344-1-α), may begin substantially contemporaneous or simultaneous (e.g., less than 6.7 psec for a resolution of 1 mm) with respect to a corresponding combined emission period (e.g., combined emission period 340-1 corresponding to the first partial range sensing period 344-1-α). Furthermore, each second partial range sensing period (e.g., second partial range sensing period 344-1-β, etc.) may be time delayed by a corresponding albedo sensing period (e.g., albedo sensing period 346-1, etc.) and a first partial range sensing period (e.g., first partial range sensing period 344-1-α) in a pair of partial range sensing periods with respect to the corresponding combined emission period (e.g., combined emission period 340-1).

It may be appreciated that by activating the EM radiation sensor device 124 for a first partial range sensing period (e.g., first partial range sensing period 344-1-α . . . first partial range sensing period 344-K-α) substantially contemporaneous or simultaneous with the corresponding combined emission period (e.g., combined emission period 340-1 . . . range emission period 340-K), the EM radiation sensor device 124 may detect or capture at least a beginning portion the spatially modulated projection (e.g., spatially modulated projection $I_1[y]$) of EM radiation reflected back from object 130 during the sensing window period ($t_w$) of the first partial range sensing period (e.g., first partial range sensing period 344-1-α).

Similarly, by activating the EM radiation sensor device 124 for a second partial range sensing period (e.g., second partial range sensing period 344-1-β . . . second partial range sensing period 344-K-β) that is time delayed by a corresponding albedo sensing period (e.g., albedo sensing period 346-1, etc.) and a first partial range sensing period, the EM radiation sensor device 124 may detect or capture at least an ending portion the spatially modulated projection (e.g., spatially modulated projection $I_1[y]$) of EM radiation reflected back from object 130 during the sensing window period ($t_w$) of the second partial range sensing period (e.g., second partial range sensing period 344-1-β).

It may be further appreciated that the overlapping area between a reflected combined emission period (e.g., reflected combined emission period 342-1) and corresponding first and second partial range sensing periods may vary based at least partially on the distance to surface ($d_s$) 144. Stated differently, the amount of the spatially modulated projection (e.g., spatially modulated projection $I_1[y]$) of EM radiation reflected back from object 130 that is detected or captured by the EM radiation sensor device 124 during the corresponding first and second partial range sensing periods may vary based at least partially on the distance from the EM radiation emitter device 122 and the EM radiation sensor device 124 to the object 130.

Thus, in some embodiments, the closer the object 130 may be with respect to the EM radiation sensor device 124 and the EM radiation emitter device 122, the greater the overlapping area may be between a reflected combined emission period (e.g., reflected combined emission period 342-1) and a corresponding first partial range sensing period (e.g., first partial range sensing period 344-1-α) and the sensor measurement during the first partial range sensing period may be higher. Similarly, the closer the object 130 may be with respect to the EM radiation sensor device 124 and the EM radiation emitter device 122, the lesser the overlapping area may be between a reflected combined emission period (e.g., reflected combined emission period 342-1) and a corresponding second partial range sensing period (e.g., second partial range sensing period 344-1-β) and the sensor measurement during the second partial range sensing period may be lower.

Alternatively, the farther away the object 130 may be with respect to the EM radiation sensor device 124 and the EM radiation emitter device 122, the lesser the overlapping area may be between a reflected combined emission period (e.g., reflected combined emission period 342-1) and a corresponding first partial range sensing period (e.g., first partial range sensing period 344-1-α) and the sensor measurement during the first partial range sensing period may be higher. Similarly, the farther away the object 130 may be with respect to the EM radiation sensor device 124 and the EM radiation emitter device 122, the greater the overlapping area may be between a reflected combined emission period (e.g., reflected combined emission period 342-1) and a corresponding second partial range sensing period (e.g., second partial range sensing period 344-1-β) and the sensor measurement during the second partial range sensing period may be higher.

Figure 4:
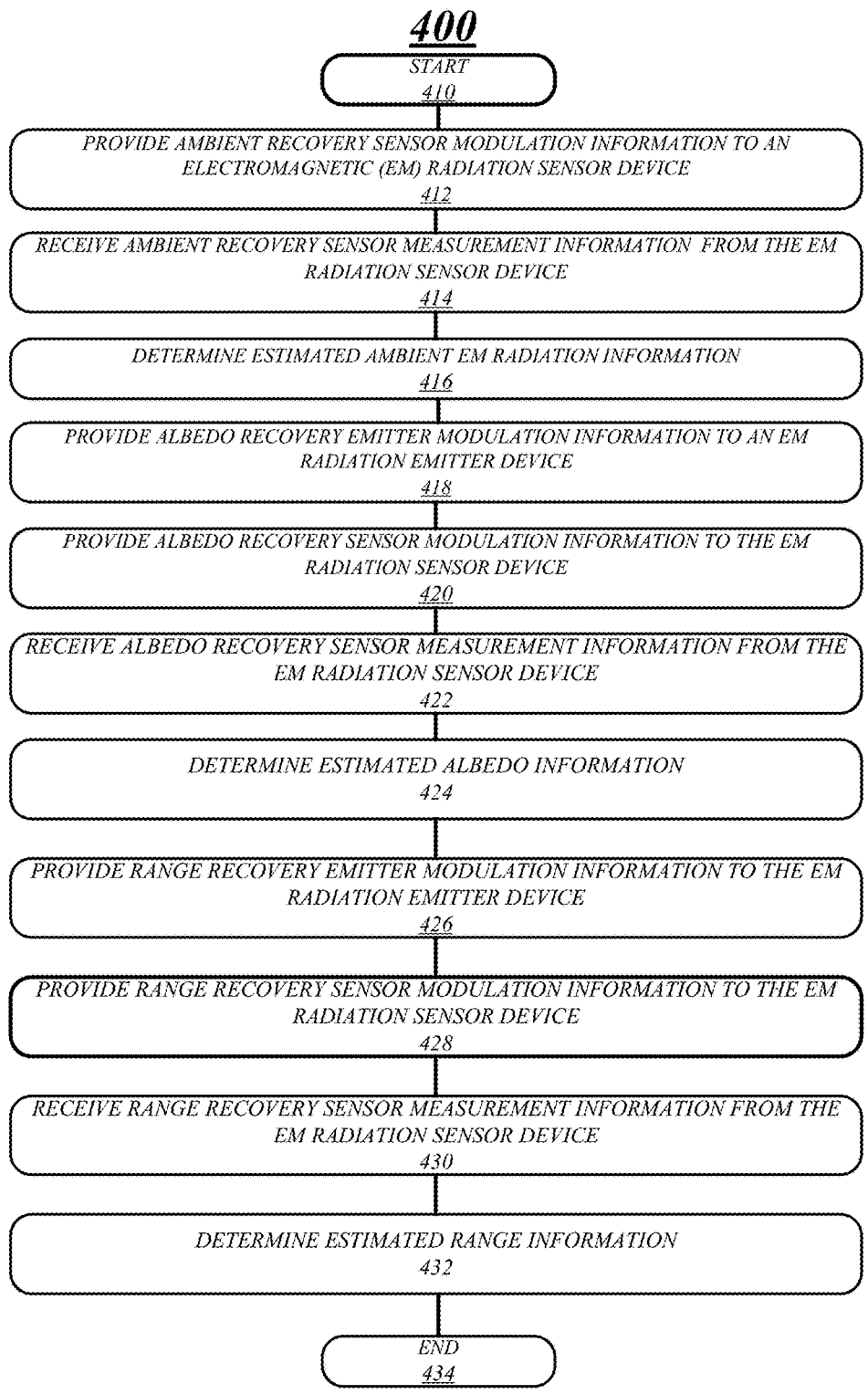
FIG. 4 illustrates an embodiment of a first logic flow diagram.

FIG. 4 illustrates an embodiment of a logic flow diagram 400. The logic flow 500 may be representative of some or all of the operations executed by one or more embodiments described herein. For example, the logic flow 400 may illustrate operations performed by the imaging system 100 illustrated in FIGS. 1, 2, 3A, and/or 3B. Moreover, the logic flow 400 may illustrate the steps, processes, instructions, and/or operations to recover at least a portion (e.g., a single column of a 640×480 resolution image, etc.) of a 2D albedo image and/or 2D range image. Various embodiments are not limited in this manner.

Logic flow 400 may start at 410 and may provide ambient recovery sensor modulation information to an electromagnetic (EM) radiation sensor device at 412. For example, sensor component 224 of the time of flight application 118 may provide ambient recovery sensor modulation information to an EM radiation sensor device 124 to temporally modulate capture of at least a portion of ambient EM radiation 148 in accordance with Phase I of timing diagram 334.

Logic flow 400 may receive ambient recovery sensor measurement information from the EM radiation sensor device at 414. For example, sensor component 224 may receive the ambient recovery sensor measurement information ($b^{Ambient}$) representative of at least a portion of the ambient EM radiation from the EM radiation sensor device 124. Additionally, the sensor component 224 may further store the received ambient recovery sensor measurement information in memory 114.

Logic flow 400 may determine estimated ambient EM radiation information at 416. For example, calculation component 226 may utilize Equation (B3) to determine estimated ambient EM radiation information based at least partially on ambient recovery sensor measurement information. Additionally, the calculation component 226 may store the estimated ambient EM radiation information in memory 114.

Logic flow 400 may provide albedo recovery emitter modulation information to an EM radiation emitter device at 418. For example, emitter component 222 may provide albedo recovery emitter modulation information to an EM radiation emitter device 122 to temporally and spatially modulate emission of EM radiation towards a surface of object 130 in accordance with time Emitter Modulation Function (E2) as illustrated in phase II of timing diagram 330 and one or more spatially modulated projections (e.g., $I_K[y]$, $I_K[x]$, $I_K[x, y]$, etc.).

Logic flow 400 may provide albedo recovery sensor modulation information to the EM radiation sensor device at 420. For example, sensor component 224 may provide albedo recovery sensor modulation information to the EM radiation sensor device 124 to temporally modulate capture of at least a portion of EM radiation in accordance with time Sensor Modulation Function (S2) as illustrated in Phase II of timing diagram 334.

Logic flow 400 may receive albedo recovery sensor measurement information from the EM radiation sensor device at 422. For example, sensor component 224 may receive one or more sensor measurements (e.g., K sensor measurements) represented by albedo recovery sensor measurement information ($b_1^{Albedo}$, $b_2^{Albedo}$, ... $b_K^{Albedo}$) from the EM radiation sensor device 124 representative of at least a portion of EM radiation emitted from the EM radiation emitter device 122 and reflected back from the surface in accordance with phase II of timing diagrams 332 and 334. Additionally, the sensor component 224 may further store the received albedo recovery sensor measurement information in memory 114.

Logic flow 400 may determine estimated albedo information at 424. For example, after receiving K sensor measurements represented by albedo recovery sensor measurement information, the calculation component 226 may utilize Equation (C5) and/or Equation (C6) to determine estimated albedo information representative of at least a portion of a 2D albedo image (e.g., a single column of the 2D albedo image, etc.) based at least partially on the albedo recovery sensor measurement information, the albedo recovery emitter modulation information, sensing matrix information, and/or the estimated ambient EM radiation information. Additionally, the calculation component 226 may store the estimated albedo information in memory 114.

Logic flow 400 may provide range recovery emitter modulation information to the EM radiation emitter device at 426. For example, emitter component 222 may provide range recovery emitter modulation information to the EM radiation emitter device 122 to temporally and spatially modulate emission of EM radiation towards the surface of the object 130 in accordance with time Emitter Modulation Function (E4) as illustrated in Phase III of timing diagram 330 and one or more spatially modulated projections (e.g., $I_K[y]$, $I_K[x]$, $I_K[x, y]$, etc.).

Logic flow 400 may provide range recovery sensor modulation information to the EM radiation sensor device at 428. For example, sensor component 224 may provide range recovery sensor modulation information to the EM radiation sensor device 124 to temporally modulate capture of at least a portion of EM radiation in accordance with time Sensor Modulation Function (S4) as illustrated in phase III of timing diagram 334.

Logic flow 400 may receive range recovery sensor measurement information from the EM radiation sensor device at 430. For example, sensor component 224 may receive one or more sensor measurements (e.g., K sensor measurements) represented by range recovery sensor measurement information ($b_1^{Range}$, $b_2^{Range}$, ... $b_K^{Range}$) from the EM radiation sensor device 124 representative of at least a portion of EM radiation emitted from the EM radiation emitter device 122 and reflected back from the surface of the object 130 as illustrated in Phase III of timing diagrams 332 and 334. Additionally, the sensor component 224 may further store the received range recovery sensor measurement information in memory 114.

Logic flow 400 may determine estimated range information at 432 and end at 434. For example, after receiving K sensor measurements represented by range recovery emitter modulation information, the calculation component 226 may utilize Equation (D9), Equation (D10), and/or Equation (A2) to determine estimated range information representative of at least a portion of a 2D range image (e.g., a single column of the 2D range image, etc.) based at least partially on range recovery sensor measurement information, the estimated albedo information, range recovery emitter modulation information, and/or sensing matrix information. Additionally, the sensor component 224 may further store the determined estimated range information in memory 114.

It may be appreciated that the steps, processes, instructions, and/or operations from 412 to 432 may be repeated in order to recover all (e.g., all columns of a 640×480 resolution image, etc.) of the 2D albedo image and/or 2D range image in substantially real time. Various embodiments are not limited in this manner.

Figure 5:
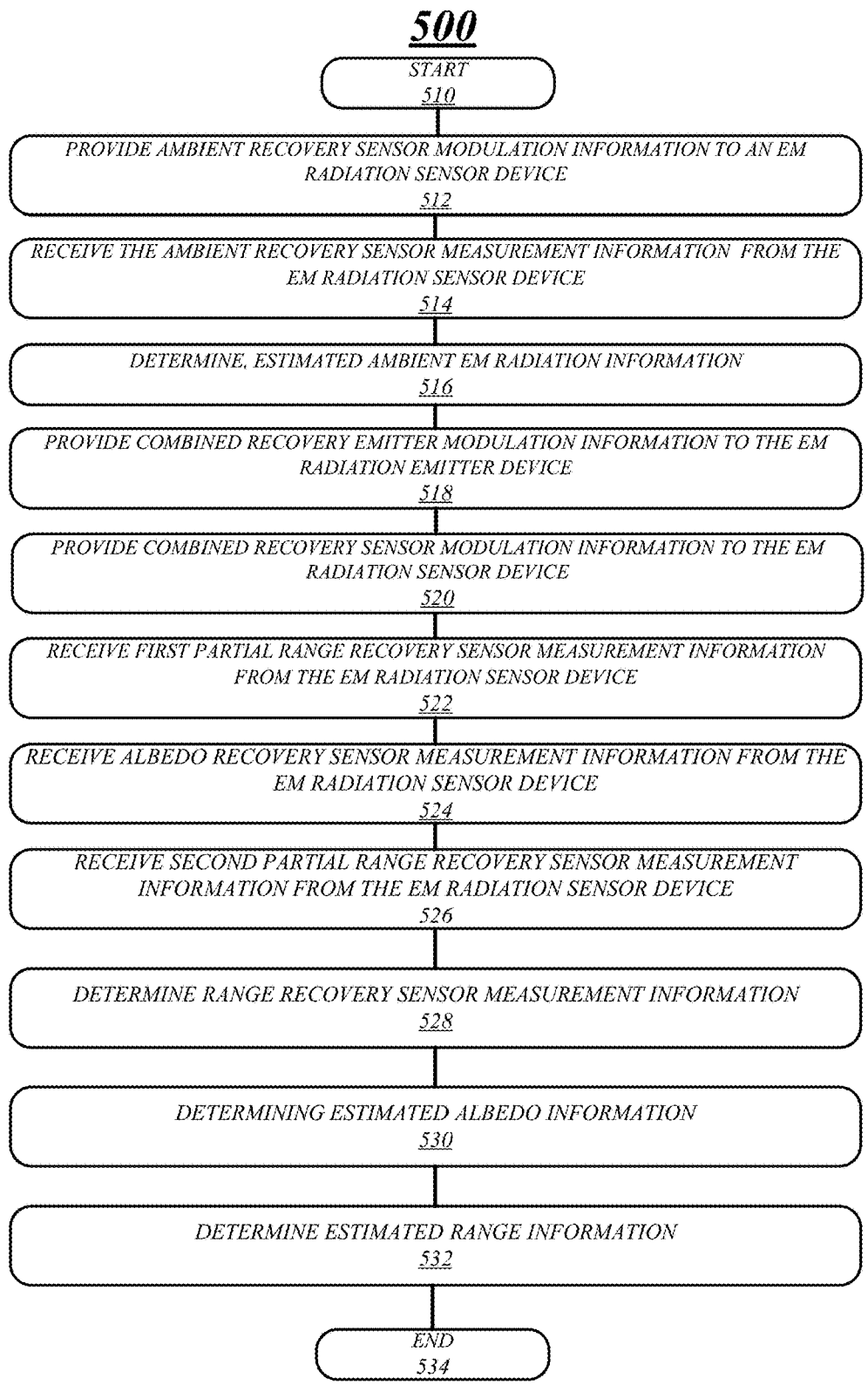
FIG. 5 illustrates an embodiment of a second logic flow diagram.

FIG. 5 illustrates an embodiment of a logic flow diagram 500. The logic flow 500 may be representative of some or all of the operations executed by one or more embodiments described herein. For example, the logic flow 500 may illustrate operations performed by one or more of the computing systems illustrated in FIGS. 1, 2, 3A and/or 3B. Moreover, the logic flow 400 may illustrate the steps, processes, instructions, and/or operations to recover at least a portion (e.g., a single column of a 640×480 resolution image, etc.) of a 2D albedo image and/or 2D range image. Various embodiments are not limited in this manner.

Logic flow 500 may start at 510 and may provide ambient recovery sensor modulation information to an electromagnetic (EM) radiation sensor device at 512. For example, sensor component 224 of the time of flight application 118 may provide ambient recovery sensor modulation information to an EM radiation sensor device 124 to temporally modulate capture of at least a portion of ambient EM radiation 148 in accordance with Phase I of timing diagram 364.

Logic flow 500 may receive ambient recovery sensor measurement information from the EM radiation sensor device at 514. For example, sensor component 224 may receive the ambient recovery sensor measurement information ($b^{Ambient}$) representative of at least a portion of the ambient EM radiation from the EM radiation sensor device 124. Additionally, the sensor component 224 may further store the received ambient recovery sensor measurement information in memory 114.

Logic flow 500 may determine estimated ambient electromagnetic (EM) radiation information at 516. For example, calculation component 226 may utilize Equation (B3) to determine estimated ambient EM radiation information based at least partially on ambient recovery sensor measurement information. Additionally, the calculation component 226 may store the estimated ambient EM radiation information in memory 114.

Logic flow 500 may provide combined recovery emitter modulation information to the EM radiation sensor device at 518. For example, emitter component 222 may provide combined recovery emitter modulation information to the EM radiation emitter device 122 to temporally and spatially modulate emission of EM radiation towards the surface of the object 130 in accordance with time Emitter Modulation Function (E3) and/or time Emitter Modulation Function (E5) as illustrated in Phase II and III of timing diagram 360 and one or more spatially modulated projections (e.g., $I_K[y]$, $I_K[x]$, $I_K[x, y]$, etc.).

Logic flow 500 may provide combined recovery sensor modulation information to the EM radiation sensor device at 520. For example, sensor component 224 may provide combined recovery sensor modulation information to the EM radiation sensor device 124 to temporally modulate capture of at least a portion of EM radiation in accordance with time Sensor Modulation Function (S3) and time Sensor Modulation Function (S5) as illustrated in phase II and III of timing diagram 364, where the combined recovery sensor modulation information may include, without limitation, albedo recovery sensor modulation information generated based at least partially on time Sensor Modulation Function (S3) and range recovery sensor modulation information generated based at least partially on time Sensor Modulation Function (S5).

Logic flow 500 may receive first partial range recovery sensor measurement information from the EM radiation sensor device at 522. For example, sensor component 224 may receive one or more sensor measurements (e.g., K sensor measurements) represented by first partial range recovery sensor measurement information ($b_1^{Partial\ Range\ \alpha}$, $b_2^{Partial\ Range\ \alpha}$, ... $b_K^{Partial\ Range\ \alpha}$) from the EM radiation sensor device 124 representative of at least a portion of EM radiation emitted from the EM radiation emitter device 122 and reflected back from the surface in accordance with Phase II and III of timing diagrams 362 and 364. Additionally, the sensor component 224 may further store the received first partial range recovery sensor measurement information in memory 114.

Logic flow 500 may receive albedo recovery sensor measurement information from the EM radiation sensor device at 524. For example, sensor component 224 may receive one or more sensor measurements (e.g., K sensor measurements) represented by albedo recovery sensor measurement information ($b_1^{Albedo}$, $b_2^{Albedo}$, ... $b_K^{Albedo}$) from the EM radiation sensor device 124 representative of at least a portion of EM radiation emitted from the EM radiation emitter device 122 and reflected back from the surface in accordance with phase II and phase III of timing diagrams 362 and 364. Additionally, the sensor component 224 may further store the received albedo recovery sensor measurement information in memory 114.

Logic flow 500 may receive second partial range recovery sensor measurement information from the EM radiation sensor device at 526. For example, sensor component 224 may receive one or more sensor measurements (e.g., K sensor measurements) represented by second partial range recovery sensor measurement information ($b_1^{Partial\ Range\ \beta}$, $b_2^{Partial\ Range\ \beta}$, ... $b_K^{Partial\ Range\ \beta}$) from the EM radiation sensor device 124 representative of at least a portion of EM radiation emitted from the EM radiation emitter device 122 and reflected back from the surface in accordance with Phase II and III of timing diagrams 362 and 364. Additionally, the sensor component 224 may further store the received second partial range recovery sensor measurement information in memory 114.

Logic flow 500 may determine range recovery sensor measurement information at 528. For example, after receiving K sensor measurements represented by first partial range recovery sensor measurement information, albedo recovery sensor measurement information, and second partial range recovery sensor measurement information, the calculation component 226 determine range recovery sensor measurement information ($b_1^{Range}$, $b_2^{Range}$, ... $b_K^{Range}$) in accordance with Equation (E6). Additionally, the calculation component 226 may further store the determined range recovery sensor measurement information ($b_1^{Range}$, $b_2^{Range}$, ... $b_K^{Range}$) in memory 114.

Logic flow 500 may determine estimated albedo information at 530. For example, after receiving K sensor measurements represented by albedo recovery sensor measurement information or after determining range recovery sensor measurement information, the calculation component 226 may utilize Equation (C5) and/or Equation (C6) to determine estimated albedo information representative of at least a portion of a 2D albedo image (e.g., a single column of the 2D albedo image, etc.) based at least partially on the albedo recovery sensor measurement information, the albedo recovery emitter modulation information, sensing matrix information, and/or the estimated ambient EM radiation information. Additionally, the calculation component 226 may store the estimated albedo information in memory 114.

Logic flow 500 may determine estimated range information at 532 and end at 534. For example, after determining range recovery sensor measurement information, the calculation component 226 may utilize Equation (D9), Equation (D10), and/or Equation (A2) to determine estimated range information representative of at least a portion of a 2D range image (e.g., a single column of the 2D range image, etc.) based at least partially on range recovery sensor measurement information, the estimated albedo information, range recovery emitter modulation information, and/or sensing matrix information. Additionally, the sensor component 224 may further store the determined estimated range information in memory 114.

It may be appreciated that the steps, processes, instructions, and/or operations 512 to 532 may be repeated in order to recover all (e.g., all columns of a 640×480 resolution image, etc.) of the 2D albedo image and/or 2D range image in substantially real time. Various embodiments are not limited in this manner.

Figure 6:
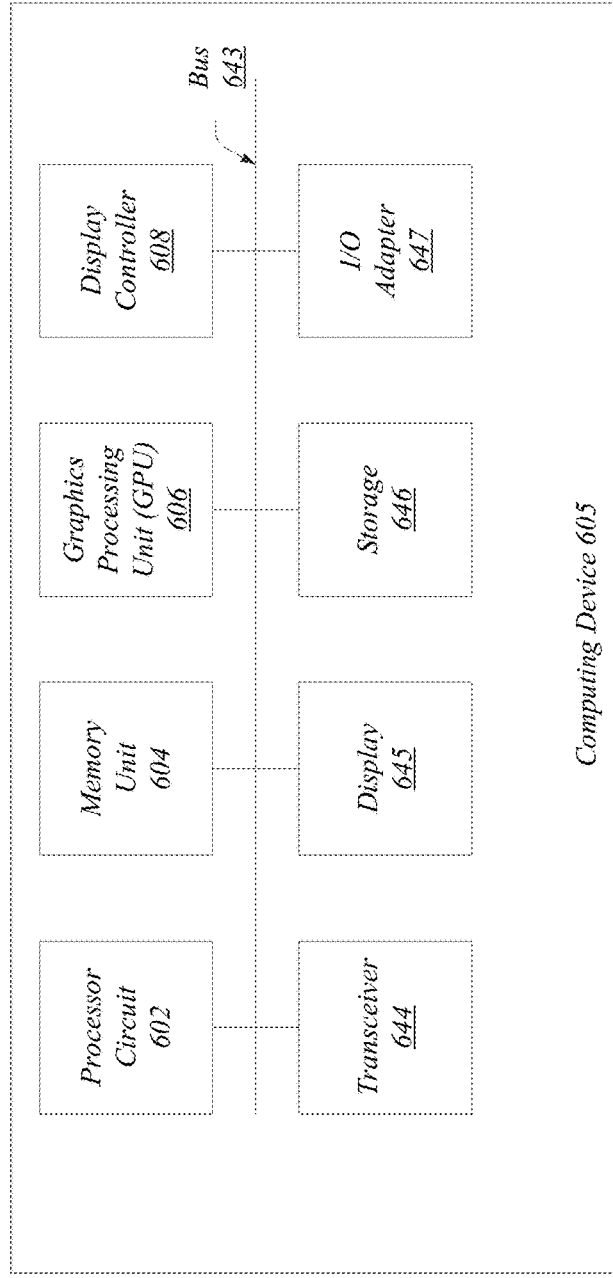
FIG. 6 illustrates an embodiment of a computing system.

FIG. 6 illustrates one embodiment of a system 600. In various embodiments, system 600 may be representative of a system or architecture suitable for use with one or more embodiments described herein, such as imaging system 100 and/or time of flight device 110. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a computing device 605 which may be any type of computer or processing device including a personal computer, desktop computer, tablet computer, netbook computer, notebook computer, laptop computer, server, server farm, blade server, or any other type of server, and so forth.

In various embodiments, computing device 605 may include processor circuit 602. Processor circuit 602 may be implemented using any processor or logic device. The processing circuit 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 602 may be connected to and communicate with the other elements of the computing system via an interconnect 643, such as one or more buses, control lines, and data lines.

In one embodiment, computing device 605 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, memory 108 may be the same as memory unit 604.

Computing device 605 may include a graphics processing unit (GPU) 606, in various embodiments. The GPU 606 may include any processing unit, logic or circuitry optimized to perform graphics-related operations as well as the video decoder engines and the frame correlation engines. The GPU 606 may be used to render 2-dimensional (2D) and/or 3-dimensional (3D) images for various applications such as video games, graphics, computer-aided design (CAD), simulation and visualization tools, imaging, etc. Various embodiments are not limited in this manner; GPU 606 may process any type of graphics data such as pictures, videos, programs, animation, 3D, 2D, objects images and so forth.

In some embodiments, computing device 605 may include a display controller 608. Display controller 608 may be any type of processor, controller, circuit, logic, and so forth for processing graphics information and displaying the graphics information. The display controller 608 may receive or retrieve graphics information from one or more buffers, such as buffer(s) 220. After processing the information, the display controller 608 may send the graphics information to a display.

In various embodiments, system 600 may include a transceiver 644. Transceiver 644 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. It may also include a transceiver for wired networking which may include (but are not limited to) Ethernet, Packet Optical Networks, (data center) network fabric, etc. In communicating across such networks, transceiver 644 may operate in accordance with one or more applicable standards in any version. The embodiments are not limited in this context.

In various embodiments, computing device 605 may include a display 645. Display 645 may constitute any display device capable of displaying information received from processor circuit 602, graphics processing unit 606 and display controller 608.

In various embodiments, computing device 605 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 605 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
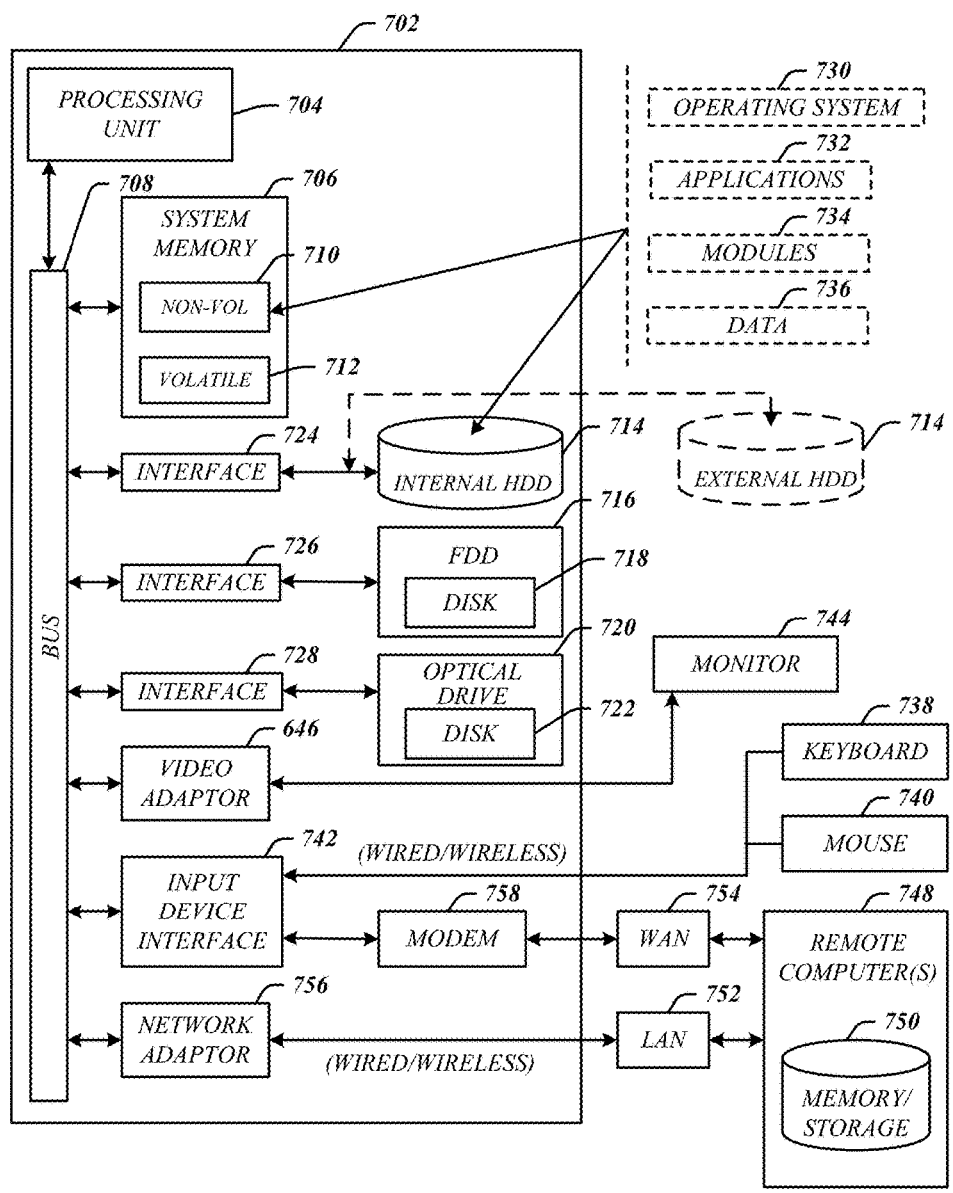
FIG. 7 illustrates an exemplary embodiment of a computing architecture.

FIG. 7 illustrates an embodiment of an exemplary computing architecture 700 suitable for implementing various embodiments as previously described. In one embodiment, the computing architecture 700 may comprise or be implemented as part of imagining system 100 and time of flight device 110.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor component 102 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 105.

A user can enter commands and information into the computer 702 through one or more wired/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wired and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the imaging system 100 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system, device, controller, and/or an apparatus can include a one or more input/output (I/O) ports at least partially implemented in circuit and logic operatively coupled to the I/O ports, at least a portion of the logic is implemented in hardware such as in circuit, the logic may include a calculation component to determine estimated ambient electromagnetic (EM) radiation information based at least partially on ambient recovery sensor measurement information, determine estimated albedo information based at least partially on albedo recovery sensor measurement information, albedo recovery emitter modulation information, sensing matrix information, and the estimated ambient EM radiation information, and determine estimated range information based at least partially on range recovery sensor measurement information, the estimated albedo information, range recovery emitter modulation information, and sensing matrix information.

In a second example and in furtherance of the first example, a system, device, controller and/or apparatus, may include a sensor component to provide ambient recovery sensor modulation information to an EM radiation sensor device to temporally modulate capture of at least a portion of ambient EM radiation, and receive the ambient recovery sensor measurement information representative of at least a portion of the ambient EM radiation from the EM radiation sensor device.

In a third example and in furtherance of any of the previous examples, a system, device, controller, or an apparatus may include ambient recovery sensor modulation information which may modulate the EM radiation sensor device to receive the ambient EM radiation during ambient sensing period without emission of EM radiation from an EM radiation emitter device associated with the system, device, controller, or the apparatus.

In a fourth example and in furtherance of any of the previous examples, a system, device, controller, or an apparatus may include an emitter component to provide albedo recovery emitter modulation information to an EM radiation emitter device to temporally and spatially modulate emission of EM radiation towards a surface by the EM radiation emitter device, and a sensor component to provide albedo recovery sensor modulation information to the EM radiation sensor device to temporally modulate capture of at least a portion of EM radiation, and receive albedo recovery sensor measurement information from the EM radiation sensor device representative of at least a portion of EM radiation emitted from the EM radiation sensor device and reflected back from the surface.

In a fifth example and in furtherance of any of the previous examples, a system, device, controller, or an apparatus may include a emitter component to provide range recovery emitter modulation information to the EM radiation emitter device to temporally and spatially modulate emission of EM radiation towards the surface by the EM radiation emitter device, and a sensor component to provide range recovery sensor modulation information to the EM radiation sensor device to temporally modulate capture of at least a portion of EM radiation, and receive range recovery sensor measurement information from the EM radiation sensor device representative of at least a portion of EM radiation emitted from the EM radiation sensor device and reflected back from the surface.

In a sixth example and in furtherance of any of the previous examples, a system, device, controller, or an apparatus may include range recovery emitter modulation information which may temporally and spatially modulate the EM radiation emitter device to emit a spatial pattern of EM radiation toward the surface for at least one range emission period, and range recovery sensor modulation information which may modulate the EM radiation sensor device to receive, for the at least one range sensing period, the at least a portion of the EM radiation emitted from the EM radiation sensor device and reflected back from the surface.

In a seventh example and in furtherance of any of the previous examples, a system, device, controller, or an apparatus may include range recovery sensor modulation information which may temporally modulate the EM radiation sensor device to receive the ambient EM radiation for the at least one range sensing period substantially contemporaneous with the emission of the spatial pattern of EM radiation for the at least one range emission period.

In an eighth example and in furtherance of any of the previous examples, a system, device, controller, or an apparatus may include one or more I/O ports that may be operatively coupled to a EM radiation emitter device and EM radiation sensor device, an EM radiation emitter device that comprises an emitter device and a mirror device, and an EM radiation sensor device that may include a detector device to detect EM radiation.

In a ninth example and in furtherance of any of the previous examples, a system, device, controller, or an apparatus may include an emitter device that may include circuitry and/or optics for emitting EM radiation towards the mirror device, and an mirror device that may include circuitry and/or optics for deflecting most of the EM radiation emitted by the emitter device in one or more angles towards an aperture in the EM radiation emitter device.

In a tenth example and in furtherance of any of the previous examples, an article comprising a non-transitory computer-readable storage medium, the non-transitory computer-readable storage medium comprising a plurality of instructions that, when executed by a processing unit, cause the processing unit to determine estimated ambient electromagnetic (EM) radiation information based at least partially on ambient recovery sensor measurement information, determine estimated albedo information based at least partially on albedo recovery sensor measurement information, albedo recovery emitter modulation information, sensing matrix information, and the estimated ambient EM radiation information, and determine estimated range information based at least partially on range recovery sensor measurement information, the estimated albedo information, range recovery emitter modulation information, and sensing matrix information.

In an eleventh example and in furtherance of any of the previous examples, an article comprising a non-transitory computer-readable storage medium, the non-transitory computer-readable storage medium comprising a plurality of instructions that, when executed by a processing unit cause the processing unit to provide ambient recovery sensor modulation information to an EM radiation sensor device to temporally modulate capture of at least a portion of ambient EM radiation; and receive the ambient recovery sensor measurement information representative of at least a portion of the ambient EM radiation from the EM radiation sensor device.

In a twelfth example and in furtherance of any of the previous examples, an article comprising a non-transitory computer-readable storage medium, the non-transitory computer-readable storage medium comprising a plurality of instructions that, when executed by a processing unit cause the processing unit to generate and/or provide ambient recovery sensor modulation information which may modulate the EM radiation sensor device to receive the ambient EM radiation during ambient sensing period without emission of EM radiation from an EM radiation emitter device.

In a thirteenth example and in furtherance of any of the previous examples, an article comprising a non-transitory computer-readable storage medium, the non-transitory computer-readable storage medium comprising a plurality of instructions that, when executed by a processing unit cause the processing unit to provide albedo recovery emitter modulation information to an EM radiation emitter device to temporally and spatially modulate emission of EM radiation towards a surface by the EM radiation emitter device; provide albedo recovery sensor modulation information to the EM radiation sensor device to temporally modulate capture of at least a portion of EM radiation; and receive albedo recovery sensor measurement information from the EM radiation sensor device representative of at least a portion of EM radiation emitted from the EM radiation sensor device and reflected back from the surface.

In a fourteenth example and in furtherance of any of the previous examples, an article comprising a non-transitory computer-readable storage medium, the non-transitory computer-readable storage medium comprising a plurality of instructions that, when executed by a processing unit cause the processing unit to generate and/or provide the albedo recovery emitter modulation information that may temporally and spatially modulate the EM radiation emitter device to emit a spatial pattern of EM radiation toward the surface for at least one albedo emission period, and albedo recovery sensor modulation information that may modulate the EM radiation sensor device to receive the at least a portion of EM radiation for at least one albedo sensing period after the EM radiation emitter device emits the spatial pattern of EM radiation for a maximum reflective period.

In a fifteenth example and in furtherance of any of the previous examples, an article comprising a non-transitory computer-readable storage medium, the non-transitory computer-readable storage medium comprising a plurality of instructions that, when executed by a processing unit cause the processing unit to generate and/or provide the albedo recovery emitter modulation information that may temporally and spatially modulate the EM radiation emitter device to emit a spatial pattern of EM radiation toward the surface for at least one albedo emission period, and each albedo emission period of the at least one albedo sensor emission period comprises the maximum reflective period and a sensing window period.

In a sixteenth example and in furtherance of any of the previous examples, an article comprising a non-transitory computer-readable storage medium, the non-transitory computer-readable storage medium comprising a plurality of instructions that, when executed by a processing unit cause the processing unit to provide range recovery emitter modulation information to the EM radiation emitter device to temporally and spatially modulate emission of EM radiation towards the surface by the EM radiation emitter device; provide range recovery sensor modulation information to the EM radiation sensor device to temporally modulate capture of at least a portion of EM radiation; and receive range recovery sensor measurement information from the EM radiation sensor device representative of at least a portion of EM radiation emitted from the EM radiation sensor device and reflected back from the surface.

In a seventeenth example and in furtherance of any of the previous examples, an article comprising a non-transitory computer-readable storage medium, the non-transitory computer-readable storage medium comprising a plurality of instructions that, when executed by a processing unit cause the processing unit to generate and/or provide range recovery emitter modulation information that may temporally and spatially modulate the EM radiation emitter device to emit a spatial pattern of EM radiation toward the surface for at least one range emission period, and range recovery sensor modulation information that may modulate the EM radiation sensor device to receive, for the at least one range sensing period, the at least a portion of the EM radiation emitted from the EM radiation sensor device and reflected back from the surface.

In an eighteenth example and in furtherance of any of the previous examples, a method may include determining, by a processor circuit, estimated ambient EM radiation information based at least partially on ambient recovery sensor measurement information; determining, by the processor circuit, estimated albedo information based at least partially on albedo recovery sensor measurement information, combined recovery emitter modulation information, sensing matrix information, and/or the estimated ambient EM radiation information; and determining, by the processor circuit, estimated range information based at least partially on range recovery sensor measurement information, the estimated albedo information, sensing matrix information, and/or albedo and range recovery emitter modulation information.

In a nineteenth example and in furtherance of any of the previous examples, a method may include providing, by a processor circuit, ambient recovery sensor modulation information to an electromagnetic (EM) radiation sensor device to temporally modulate capture of at least a portion of ambient EM radiation; and receiving, by the processor circuit, the ambient recovery sensor measurement information representative of at least a portion of the ambient EM radiation from the EM radiation sensor device.

In a twentieth example and in furtherance of any of the previous examples, a method may include generating and/or providing ambient EM radiation sensor modulation information that may modulate the EM radiation sensor device to receive the ambient EM radiation for an ambient sensing period without emission of EM radiation from an EM radiation emitter device.

In a twenty-first example and in furtherance of any of the previous examples, a method may include providing, by the processor circuit, the combined recovery emitter modulation information to an EM radiation emitter device to temporally and spatially modulate emission of EM radiation towards a surface; and providing, by the processor circuit, combined recovery sensor modulation information to the EM radiation sensor device to temporally modulate capture of at least a portion of EM radiation, wherein the combined recovery sensor modulation information comprises the albedo recovery sensor modulation information and range recovery sensor modulation information.

In a twenty-second example and in furtherance of any of the previous examples, a method may include generating and/or providing combined recovery emitter modulation information that may temporally and spatially modulate the EM radiation emitter device to emit a spatial pattern of EM radiation toward the surface for at least one combined emission period, and each combined emission period comprises two consecutive sensing window periods, the two consecutive sensing window periods comprises a first sensing window period followed by a second sensing window period.

In a twenty-third example and in furtherance of any of the previous examples, a method may generate and/or provide range recovery sensor modulation information that may temporally modulate capture of at least a portion of EM radiation for at least one pair of partial range sensing periods, each pair of partial range sensing periods comprises a first partial range sensing period and a second partial range sensing period, and albedo recovery sensor modulation information that may temporally modulate capture of at least a portion of EM radiation for at least one albedo sensing period, the at least one albedo sensing period is between the first partial range sensing period and the second partial range sensing period.

In a twenty-fourth example and in furtherance of any of the previous examples, a method may include receiving, by the processor circuit, the albedo recovery sensor measurement information from the EM radiation sensor device representative of the EM radiation emitted from the EM radiation sensor device and reflected back from the surface during the at least one albedo sensing period.

In a twenty-fifth example and in furtherance of any of the previous examples, a method may include receiving, by the processor circuit, first partial range recovery sensor measurement information from the EM radiation sensor device representative of the EM radiation emitted from the EM radiation sensor device and reflected back from the surface during the first partial range sensing period; receiving, by the processor circuit, second partial range recovery sensor measurement information from the EM radiation sensor device representative of the EM radiation emitted from the EM radiation sensor device and reflected back from the surface during the second partial range sensing period; and determining, by the processor circuit, the range recovery sensor measurement information based at least partially on the first partial range recovery sensor measurement information, the second partial range recovery sensor measurement information, and/or the albedo recovery sensor measurement information.

In a twenty-sixth example and in furtherance of any of the previous examples, a system, device, controller and/or apparatus, may include means for determining estimated ambient EM radiation information based at least partially on ambient recovery sensor measurement information; means for determining estimated albedo information based at least partially on albedo recovery sensor measurement information, combined recovery emitter modulation information, sensing matrix information, and/or the estimated ambient EM radiation information; and means for determining estimated range information based at least partially on range recovery sensor measurement information, the estimated albedo information, sensing matrix information, and/or albedo and range recovery emitter modulation information.

In a twenty-seventh example and in furtherance of any of the previous examples, a system, device, controller and/or apparatus, may include means for providing ambient recovery sensor modulation information to an electromagnetic (EM) radiation sensor device to temporally modulate capture of at least a portion of ambient EM radiation; and means for receiving the ambient recovery sensor measurement information representative of at least a portion of the ambient EM radiation from the EM radiation sensor device.

In a twenty-eighth example and in furtherance of any of the previous examples, a system, device, controller and/or apparatus, may include, ambient EM radiation sensor modulation information that may modulate the EM radiation sensor device to receive the ambient EM radiation for an ambient sensing period without emission of EM radiation from an EM radiation emitter device.

In a twenty-ninth example and in furtherance of any of the previous examples, a system, device, controller and/or apparatus, may include means for providing the combined recovery emitter modulation information to an EM radiation emitter device to temporally and spatially modulate emission of EM radiation towards a surface; and means for providing combined recovery sensor modulation information to the EM radiation sensor device to temporally modulate capture of at least a portion of EM radiation, wherein the combined recovery sensor modulation information comprises the albedo recovery sensor modulation information and range recovery sensor modulation information.

In a thirtieth example and in furtherance of any of the previous examples, a system, device, controller and/or apparatus, may include combined recovery emitter modulation information that may temporally and spatially modulate the EM radiation emitter device to emit a spatial pattern of EM radiation toward the surface for at least one combined emission period, and each combined emission period comprises two consecutive sensing window periods, the two consecutive sensing window periods comprises a first sensing window period followed by a second sensing window period.

In a thirty-first example and in furtherance of any of the previous examples, a system, device, controller and/or apparatus, may include range recovery sensor modulation information that temporally modulate capture of at least a portion of EM radiation for at least one pair of partial range sensing periods, each pair of partial range sensing periods comprises a first partial range sensing period and a second partial range sensing period, and albedo recovery sensor modulation information that may temporally modulate capture of at least a portion of EM radiation for at least one albedo sensing period, the at least one albedo sensing period is between the first partial range sensing period and the second partial range sensing period.

In a thirty-second example and in furtherance of any of the previous examples, a system, device, controller and/or apparatus, may include means for receiving the albedo recovery sensor measurement information from the EM radiation sensor device representative of the EM radiation emitted from the EM radiation sensor device and reflected back from the surface during the at least one albedo sensing period.

In a thirty-third example and in furtherance of any of the previous examples, a system, device, controller and/or apparatus, may include means for receiving first partial range recovery sensor measurement information from the EM radiation sensor device representative of the EM radiation emitted from the EM radiation sensor device and reflected back from the surface during the first partial range sensing period; means for receiving second partial range recovery sensor measurement information from the EM radiation sensor device representative of the EM radiation emitted from the EM radiation sensor device and reflected back from the surface during the second partial range sensing period; and means for determining the range recovery sensor measurement information based at least partially on the first partial range recovery sensor measurement information, the second partial range recovery sensor measurement information, and/or the albedo recovery sensor measurement information.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   one or more input/output (I/O) ports; and
   logic operatively coupled to the I/O ports, at least a portion of the logic is implemented in hardware, the logic comprising a calculation component to:
     provide, via the one or more I/O ports, ambient recovery sensor modulation information to an electromagnetic (EM) radiation sensor device coupled to the one or more I/O ports, the ambient recovery sensor modulation information to temporally modulate the EM radiation sensor device to receive ambient EM radiation during an ambient sensing period without substantial emission of EM radiation from an EM radiation emitter device associated with the EM radiation sensor device;
     receive, via the one or more I/O ports, ambient recovery sensor measurement information representative of at least a portion of the ambient EM radiation received at the EM radiation sensor device;
     determine estimated ambient EM radiation information based at least partially on the ambient recovery sensor measurement information;
     determine estimated albedo information based at least partially on albedo recovery sensor measurement information, albedo recovery emitter modulation information, sensing matrix information, and the estimated ambient EM radiation information; and
     determine estimated range information based at least partially on range recovery sensor measurement information, the estimated albedo information, range recovery emitter modulation information, and sensing matrix information.

2. The apparatus of claim 1, wherein the logic further comprises:
an emitter component to provide albedo recovery emitter modulation information to an EM radiation emitter device to temporally and spatially modulate emission of EM radiation towards a surface by the EM radiation emitter device,
a sensor component to:
provide albedo recovery sensor modulation information to the EM radiation sensor device to temporally modulate capture of at least a portion of EM radiation, and
receive albedo recovery sensor measurement information from the EM radiation sensor device, the albedo recovery sensor measurement information representative of at least a portion of EM radiation emitted from the EM radiation sensor device and reflected back from the surface.

3. The apparatus of claim 2, wherein the logic further comprises:
an emitter component to provide range recovery emitter modulation information to the EM radiation emitter device to temporally and spatially modulate emission of EM radiation towards the surface by the EM radiation emitter device, and
a sensor component to:
provide range recovery sensor modulation information to the EM radiation sensor device to temporally modulate capture of at least a portion of EM radiation, and
receive range recovery sensor measurement information from the EM radiation sensor device representative of at least a portion of EM radiation emitted from the EM radiation sensor device and reflected back from the surface.

4. The apparatus of claim 3, wherein
the range recovery emitter modulation information is to temporally and spatially modulate the EM radiation emitter device to emit a spatial pattern of EM radiation toward the surface for at least one range emission period, and
the range recovery sensor modulation information is to modulate the EM radiation sensor device to receive, for the at least one range sensing period, the at least a portion of the EM radiation emitted from the EM radiation sensor device and reflected back from the surface.

5. The apparatus of claim 4, wherein the range recovery sensor modulation information is to temporally modulate the EM radiation sensor device to receive the ambient EM radiation for the at least one range sensing period substantially contemporaneous with the emission of the spatial pattern of EM radiation for the at least one range emission period.

6. The apparatus of claim 1, wherein
the one or more I/O ports is operatively coupled to a EM radiation emitter device and EM radiation sensor device,
the EM radiation emitter device comprises an emitter device and a mirror device, and
the EM radiation sensor device comprises a detector device to detect EM radiation.

7. The apparatus of claim 6, wherein
the emitter device comprises circuitry and/or optics for emitting EM radiation towards the mirror device, and
the mirror device comprises circuitry and/or optics for deflecting most of the EM radiation emitted by the emitter device in one or more angles towards an aperture in the EM radiation emitter device.

8. An article comprising a non-transitory computer-readable storage medium, the non-transitory computer-readable storage medium comprising a plurality of instructions that, when executed by a processing unit, cause the processing unit to:
provide, via the one or more I/O ports, ambient recovery sensor modulation information to an electromagnetic (EM) radiation sensor device coupled to the one or more I/O ports, the ambient recovery sensor modulation information to temporally modulate the EM radiation sensor device to receive ambient EM radiation during an ambient sensing period without substantial emission of EM radiation from an EM radiation emitter device associated with the EM radiation sensor device;
receive, via the one or more I/O ports, ambient recovery sensor measurement information representative of at least a portion of the ambient EM radiation received at the EM radiation sensor device;
determine estimated ambient EM radiation on information based at least partially on the ambient recovery sensor measurement information;
determine estimated albedo information based at least partially on albedo recovery sensor measurement information, albedo recovery emitter modulation information, sensing matrix information, and the estimated ambient EM radiation information; and
determine estimated range information based at least partially on range recovery sensor measurement information, the estimated albedo information, range recovery emitter modulation information, and sensing matrix information.

9. The non-transitory computer-readable storage medium of claim 8, comprising the plurality of instructions that, when executed by the processing unit, further cause the processing unit to:
provide albedo recovery emitter modulation information to an EM radiation emitter device to temporally and spatially modulate emission of EM radiation towards a surface by the EM radiation emitter device;
provide albedo recovery sensor modulation information to the EM radiation sensor device to temporally modulate capture of at least a portion of EM radiation; and
receive albedo recovery sensor measurement information from the EM radiation sensor device representative of at least a portion of EM radiation emitted from the EM radiation sensor device and reflected back from the surface.

10. The non-transitory computer-readable storage medium of claim 9, wherein
the albedo recovery emitter modulation information is to temporally and spatially modulate the EM radiation emitter device to emit a spatial pattern of EM radiation toward the surface for at least one albedo emission period, and
the albedo recovery sensor modulation information is to modulate the EM radiation sensor device to receive the at least a portion of EM radiation for at least one albedo sensing period after the EM radiation emitter device emits the spatial pattern of EM radiation for a maximum reflective period.

11. The non-transitory computer-readable storage medium of claim 10, wherein each albedo emission period of the at least one albedo emission period comprises the maximum reflective period and a sensing window period.

12. The non-transitory computer-readable storage medium of claim 8, comprising the plurality of instructions that, when executed by the processing unit, further cause the processing unit to:
provide range recovery emitter modulation information to the EM radiation emitter device to temporally and spatially modulate emission of EM radiation towards a surface by the EM radiation emitter device;
provide range recovery sensor modulation information to the EM radiation sensor device to temporally modulate capture of at least a portion of EM radiation; and
receive range recovery sensor measurement information from the EM radiation sensor device representative of at least a portion of EM radiation emitted from the EM radiation sensor device and reflected back from the surface.

13. The non-transitory computer-readable storage medium of claim 12, wherein
the range recovery emitter modulation information is to temporally and spatially modulate the EM radiation emitter device to emit a spatial pattern of EM radiation toward the surface for at least one range emission period, and
the range recovery sensor modulation information is to modulate the EM radiation sensor device to receive, for the at least one range sensing period, the at least a portion of the EM radiation emitted from the EM radiation sensor device and reflected back from the surface.

14. A computer-implemented method, comprising:
providing, by a processor circuit via the one or more I/O ports, ambient recovery sensor modulation information to an electromagnetic (EM) radiation sensor device coupled to the one or more I/O ports, the ambient recovery sensor modulation information to temporally modulate the EM radiation sensor device to receive ambient EM radiation during an ambient sensing period without substantial emission of EM radiation from an EM radiation emitter device associated with the EM radiation sensor device;
receiving, by the processor circuit via the one or more I/O ports, ambient recovery sensor measurement information representative of at least a portion of the ambient EM radiation received at the EM radiation sensor device;
determining, by the processor circuit, estimated ambient EM radiation information based at least partially on the ambient recovery sensor measurement information;
determining, by the processor circuit, estimated albedo information based at least partially on albedo recovery sensor measurement information, combined recovery emitter modulation information, sensing matrix information, and/or the estimated ambient EM radiation information; and
determining, by the processor circuit, estimated range information based at least partially on range recovery sensor measurement information, the estimated albedo information, sensing matrix information, and/or albedo and range recovery emitter modulation information.

15. The computer-implemented method of claim 14, further comprising:
providing, by the processor circuit, the combined recovery emitter modulation information to an EM radiation emitter device to temporally and spatially modulate emission of EM radiation towards a surface; and
providing, by the processor circuit, albedo recovery sensor modulation information and range recovery sensor modulation information to the EM radiation sensor device to temporally modulate capture of at least a portion of EM radiation.

16. The computer-implemented method of 15, wherein
the combined recovery emitter modulation information is to temporally and spatially modulate the EM radiation emitter device to emit a spatial pattern of EM radiation toward the surface for at least one combined emission period, and
each combined emission period comprises two consecutive sensing window periods, the two consecutive sensing window periods comprises a first sensing window period followed by a second sensing window period.

17. The computer-implemented method of 15, wherein
the range recovery sensor modulation information is to temporally modulate capture of at least a portion of EM radiation for at least one pair of partial range sensing periods, each pair of partial range sensing periods comprises a first partial range sensing period and a second partial range sensing period, and
the albedo recovery sensor modulation information is to temporally modulate capture of at least a portion of EM radiation for at least one albedo sensing period, the at least one albedo sensing period is between the first partial range sensing period and the second partial range sensing period.

18. The computer-implemented method of 17, further comprising:
receiving, by the processor circuit, the albedo recovery sensor measurement information from the EM radiation sensor device representative of the EM radiation emitted from the EM radiation sensor device and reflected back from the surface during the at least one albedo sensing period.

19. The computer-implemented method of 17, further comprising:
receiving, by the processor circuit, first partial range recovery sensor measurement information from the EM radiation sensor device representative of the EM radiation emitted from the EM radiation sensor device and reflected back from the surface during the first partial range sensing period;
receiving, by the processor circuit, second partial range recovery sensor measurement information from the EM radiation sensor device representative of the EM radiation emitted from the EM radiation sensor device and reflected back from the surface during the second partial range sensing period; and
determining, by the processor circuit, the range recovery sensor measurement information based at least partially on the first partial range recovery sensor measurement information, the second partial range recovery sensor measurement information, and/or the albedo recovery sensor measurement information.

* * * * *